(12) United States Patent
Abe et al.

(10) Patent No.: US 7,089,227 B2
(45) Date of Patent: Aug. 8, 2006

(54) PATTERN RETRIEVING METHOD, PATTERN RETRIEVAL APPARATUS, COMPUTER-READABLE STORAGE MEDIUM STORING PATTERN RETRIEVAL PROGRAM, PATTERN RETRIEVAL SYSTEM, AND PATTERN RETRIEVAL PROGRAM

(75) Inventors: Fumirou Abe, Kawasaki (JP); Masataka Matsuura, Kawasaki (JP); Masahiko Nagata, Fukuoka (JP); Yasuhisa Hara, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 346 days.

(21) Appl. No.: 09/998,225

(22) Filed: Dec. 3, 2001

(65) Prior Publication Data
US 2002/0099698 A1 Jul. 25, 2002

(30) Foreign Application Priority Data
Jan. 25, 2001 (JP) ............................. 2001-016576

(51) Int. Cl.
G06F 7/00 (2006.01)
G06F 17/30 (2006.01)
(52) U.S. Cl. ............................................ 707/3; 707/2
(58) Field of Classification Search ................... 707/3, 707/4, 6, 2, 1
See application file for complete search history.

(56) References Cited

U.S. PATENT DOCUMENTS

| 5,454,105 A | | 9/1995 | Hatakeyama et al. ........ 395/600 |
| 6,029,165 A | * | 2/2000 | Gable ............................. 707/3 |
| 6,094,647 A | * | 7/2000 | Kato et al. ...................... 707/2 |
| 6,385,605 B1 | * | 5/2002 | Suzuoka et al. ................ 707/4 |
| 6,487,566 B1 | * | 11/2002 | Sundaresan ................. 715/513 |
| 6,487,641 B1 | * | 11/2002 | Cusson et al. .............. 711/144 |
| 6,493,705 B1 | * | 12/2002 | Kobayashi et al. ............. 707/3 |
| 6,526,400 B1 | * | 2/2003 | Takata et al. ................... 707/3 |
| 6,584,465 B1 | * | 6/2003 | Zhu et al. ....................... 707/6 |
| 2001/0037325 A1 | * | 11/2001 | Biderman et al. ............. 707/1 |

FOREIGN PATENT DOCUMENTS

EP 0 561 364 9/1993

(Continued)

OTHER PUBLICATIONS

Alfred V. Aho, et al., "Efficient String Matching: An Aid to Bibliographic Search" Communications of the ACM, vol. 18, No. 6, Jun. 1975, p. 333-340.

(Continued)

Primary Examiner—Greta Robinson
Assistant Examiner—Kuen S. Lu
(74) Attorney, Agent, or Firm—Staas & Halsey LLP

(57) ABSTRACT

In a full text search retrieval device connected to a plurality of user terminals, a received retrieval condition and terminal device information are stored in a trailing character buffer. If it is determined that a preceding retrieving process is not being performed, then a retrieval pattern variable table and a retrieval request expression variable table are generated. According to the retrieval request expression variable table, a database of the data to be searched is searched to extract a retrieval result matching the retrieval condition transmitted from each of the terminal devices, and the extracted retrieval result is transmitted to each of the plurality of terminal devices. Thus, although retrieval requests are continuously transmitted from respective users, a retrieval result can be returned to each user terminal in the same response time as in the case where a user terminal corresponds to a retrieval device.

22 Claims, 32 Drawing Sheets

FOREIGN PATENT DOCUMENTS

| | | |
|---|---|---|
| EP | 0 818 741 | 1/1998 |
| JP | 6-60121 | 3/1994 |
| JP | 10-27182 | 1/1998 |

OTHER PUBLICATIONS

Timos K. Sellis, "Multiple-Query Optimization" ACM Transactions on Database Systems, vol. 13, No. Mar. 1, 1988, p. 23-52.

Ando, K. et al., "Efficient multi-attribute pattern matching using the extended Aho-Corasick method", System, Man, and Cybernetics, 1997. Computational Cybernetics and Simulation., 1997, IEEE Int'l Conference on Orlando, FL, Oct. 12-15, 1997, pp. 3936-3941.

Aho, A. V. et al., "Efficient String Matching: An Aid to Bibliographic Search", Communications of the Association for Computing Machinery, Association for Computing Machinery. New York, US., vol. 18, No. 6, Jun. 1975, pp. 333-340.

Kida T., et al., "A unifying framework for compressed pattern matching", String Processing and Information Retrieval Symposium, 1999 and International Workshop on Groupware, Cancun, Mexico Sep. 22-24, 1999, Los Alamitos, CA, USA, IEEE Comput. Soc., US, Sep. 22, 1999, pp. 89-96.

European Search Report for corresponding EP application No. 01 3100381 dated May 24, 2004.

Copy of Japanese Office Action (Notice of Rejection Grounds) dated May 18, 2004.

Canadian Office Action dated Nov. 9, 2004.

Masahiro Nakamura, "Textual" structure is advantageous in terms of flexibility and performance, Nikkei Computer, No. 493, Apr. 10, 2000.

* cited by examiner

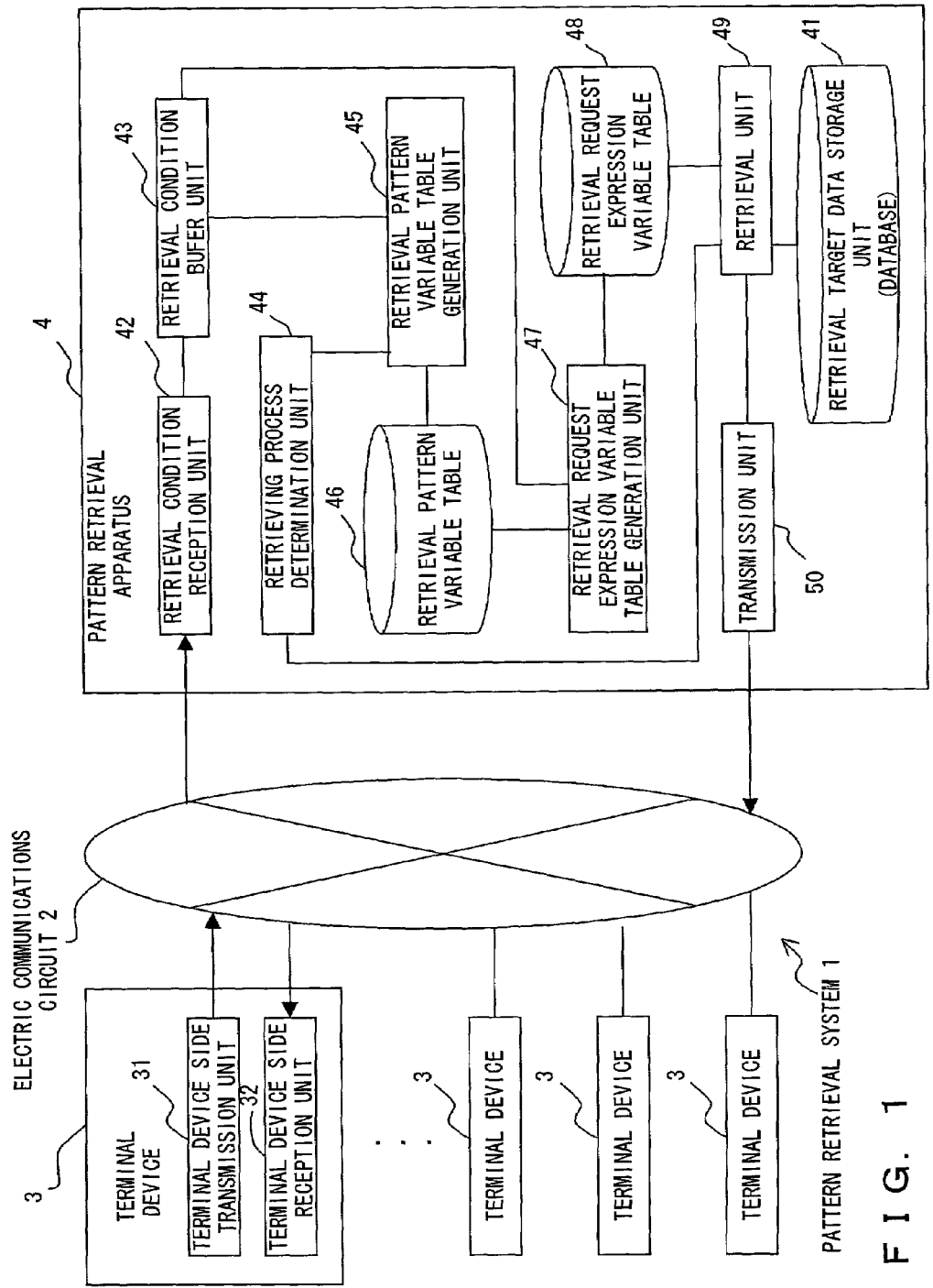
F I G. 1

| DETERMINATION TARGET 4-BIT VALUE | NEXT DETERMINATION TABLE ADDRESS |
|---|---|
| 0 | DETERMINATION TABLE ADDRESS OF [DETERMINATION 1] |
| 1 | DETERMINATION TABLE ADDRESS OF [DETERMINATION 1] |
| 2 | DETERMINATION TABLE ADDRESS OF [DETERMINATION 1] |
| 3 | DETERMINATION TABLE ADDRESS OF [DETERMINATION 1] |
| 4 | DETERMINATION TABLE ADDRESS OF [DETERMINATION 1] |
| 5 | DETERMINATION TABLE ADDRESS OF [DETERMINATION 1] |
| 6 | DETERMINATION TABLE ADDRESS OF [DETERMINATION 1] |
| 7 | DETERMINATION TABLE ADDRESS OF [DETERMINATION 1] |
| 8 | DETERMINATION TABLE ADDRESS OF [DETERMINATION 2-2] |
| 9 | DETERMINATION TABLE ADDRESS OF [DETERMINATION 2-1] |
| 10 | DETERMINATION TABLE ADDRESS OF [DETERMINATION 1] |
| 11 | DETERMINATION TABLE ADDRESS OF [DETERMINATION 1] |
| 12 | DETERMINATION TABLE ADDRESS OF [DETERMINATION 1] |
| 13 | DETERMINATION TABLE ADDRESS OF [DETERMINATION 1] |
| 14 | DETERMINATION TABLE ADDRESS OF [DETERMINATION 1] |
| 15 | DETERMINATION TABLE ADDRESS OF [DETERMINATION 1] |

F I G. 4

PATTERN = {ABCD, BCDE}
| A | B | C | D | E | F | . . . . . . . . . . . . . . . . . . . . . | Z |
|---|---|---|---|---|---|---|---|
| 3 | 2 | 1 | 0 | 4 | 4 | 4 . . . . . . . . . . . . . . . . . . 4 | 4 |
del_abcd
| A | B | C | D | E | F | . . . . . . . . . . . . . . . . . . . . . | Z |
|---|---|---|---|---|---|---|---|
| 4 | 3 | 2 | 1 | 0 | 4 | 4 . . . . . . . . . . . . . . . . . . 4 | 4 |
del_bcde
| A | B | C | D | E | F | . . . . . . . . . . . . . . . . . . . . . | Z |
|---|---|---|---|---|---|---|---|
| 3 | 2 | 1 | L | L | 4 | 4 . . . . . . . . . . . . . . . . . . 4 | 4 |
del_com            (L(large)=textlen+4+1)
F I G. 5 A
PATTERN = {ABCD, BCDE, CDFE}
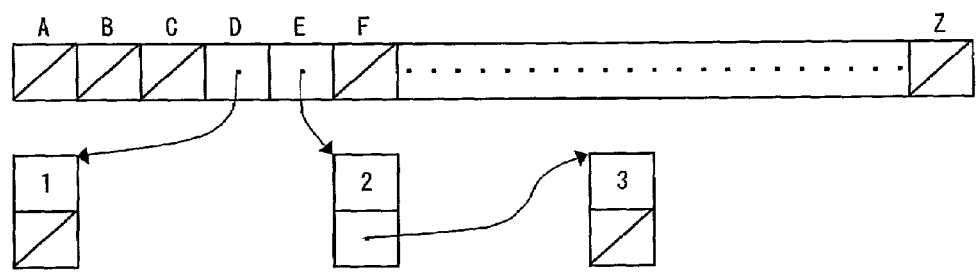
F I G. 5 B

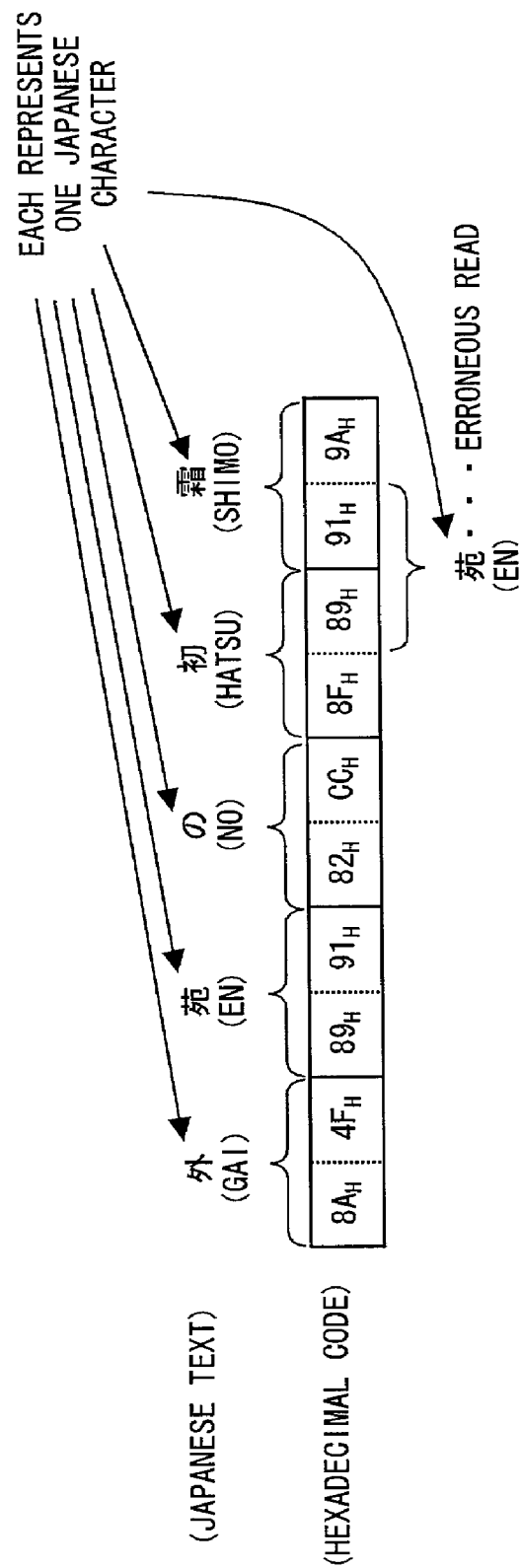
F I G. 6

CONTENTS OF TEXT DATA TO BE SEARCHED

[K]<NAME>MASATAKA MATSUURA[K]<GRADUATE OF>WASEDA UNIVERSITY[K]<BIRTH PLACE>KANAGAWA PREF.[K]<SEX>MALE[K][R]
[K]<NAME>YOKO TABATA[K]<GRADUATE OF>TSUKUBA UNIVERSITY[K]<BIRTH PLACE>ISHIKAWA PREF.[K]<SEX>FEMALE[K][R]
[K]<NAME>SHIRO ABE[K]<GRADUATE OF>KYUSHU UNIVERSITY[K]<BIRTH PLACE>OITA PREF.[K]<SEX>MALE[K][R]

F I G. 1 0

(NOTE) [R]:RECORD DELIMITER, [K]:ITEM DELIMITER, <CHARACTER STRING>:ITEM IDENTIFIER CODE(ITEM TAG)

RETRIEVAL REQUEST

|  | ITEM TAG | WORD TO BE RETRIEVED |
|---|---|---|
| A | <NAME> | MASATAKA MATSUURA |
| B | <GRADUATED FROM> | WASEDA UNIVERSITY |
| RETRIEVAL CONDITION EXPRESSION | | A and B |

RETRIEVAL REQUEST TABLE

| | | ITEM TAG | WORD TO BE RETRIEVED |
|---|---|---|---|
| RETRIEVAL REQUEST A | A | <NAME> | MASATAKA MATSUURA |
| | B | <GRADUATE FROM> | WASEDA UNIVERSITY |
| | RETRIEVAL CONDITION EXPRESSION | | A and B |
| RETRIEVAL REQUEST B | A | <GRADUATE FROM> | TSUKUBA UNIVERSITY |
| | B | <BIRTH PLACE> | KANAGAWA PREF. |
| | RETRIEVAL CONDITION EXPRESSION | | A or B |
| RETRIEVAL REQUEST C | A | <SEX> | MALE |
| | B | <BIRTH PLACE> | OITA PREF. |
| | RETRIEVAL CONDITION EXPRESSION | | A and B |

KEYWORD VARIABLE TABLE

| KEYWORD VARIABLE | KEYWORD | HIT FLAG |
|---|---|---|
| A1 | <NAME> | 0 |
| A2 | MASATAKA MATSUURA | 0 |
| A3 | <GRADUATE OF> | 0 |
| A4 | WASEDA UNIVERSITY | 0 |
| A5 | TSUKUBA UNIVERSITY | 0 |
| A6 | <BIRTH PLACE> | 0 |
| A7 | KANAGAWA PREF. | 0 |
| A8 | <SEX> | 0 |
| A9 | MALE | 0 |
| A10 | OITA PREF. | 0 |

KEYWORD VARIABLE TABLE

| KEYWORD VARIABLE | CHARACTER STRING TO BE RETRIEVED | HIT FLAG |
|---|---|---|
| A1 | <NAME> | 1 |
| A2 | MASATAKA MATSUURA | 1 |
| A3 | <GRADUATE OF> | 0 |
| A4 | WASEDA UNIVERSITY | 0 |
| A5 | TSUKUBA UNIVERSITY | 0 |
| A6 | <BIRTH PLACE> | 0 |
| A7 | KANAGAWA PREF. | 0 |
| A8 | <SEX> | 0 |
| A9 | MALE | 0 |
| A10 | OITA PREF. | 0 |

FIG. 24A

RETRIEVAL REQUEST EXPRESSION VARIABLE TABLE

| EXPRESSION VARIABLE | LAST EXPRESSION VARIABLE ID | LAST EXPRESSION VARIABLE ID | HIT FLAG |
|---|---|---|---|
| Z1 | A1 and A2 | 0 | 1 |
| Z2 | A3 and A4 | 0 | 1 |
| Z3 | Z1 and Z2 | 1 | 0 |
| Z4 | A3 and A5 | 0 | 0 |
| Z5 | A6 and A7 | 0 | 0 |
| Z6 | Z4 or Z5 | 2 | 0 |
| Z7 | A8 and A9 | 0 | 0 |
| Z8 | A6 and A10 | 0 | 0 |
| Z9 | Z7 and Z8 | 3 | 0 |

FIG. 24B

KEYWORD VARIABLE TABLE

| KEYWORD VARIABLE | CHARACTER STRING TO BE RETRIEVED | HIT FLAG |
|---|---|---|
| A1 | <NAME> | 0 |
| A2 | MASATAKA MATSUURA | 0 |
| A3 | <GRADUATE OF> | 0 |
| A4 | WASEDA UNIVERSITY | 0 |
| A5 | TSUKUBA UNIVERSITY | 0 |
| A6 | <BIRTH PLACE> | 0 |
| A7 | KANAGAWA PREF. | 1 |
| A8 | <SEX> | 1 |
| A9 | MALE | 0 |
| A10 | OITA PREF. | 0 |

FIG. 25A

RETRIEVAL REQUEST EXPRESSION VARIABLE TABLE

| EXPRESSION VARIABLE | RETRIEVAL LOGIC EXPRESSION | LAST EXPRESSION VARIABLE ID | HIT FLAG |
|---|---|---|---|
| Z1 | A1 and A2 | 0 | 1 |
| Z2 | A3 and A4 | 0 | 1 |
| Z3 | Z1 and Z2 | 1 | 1 |
| Z4 | A3 and A5 | 0 | 0 |
| Z5 | A6 and A7 | 0 | 1 |
| Z6 | Z4 or Z5 | 2 | 1 |
| Z7 | A8 and A9 | 0 | 1 |
| Z8 | A6 and A10 | 0 | 0 |
| Z9 | Z7 and Z8 | 3 | 0 |

FIG. 25B

RETRIEVAL RESULT TABLE

| LAST EXPRESSION VARIABLE ID | CONTENTS OF HIT RECORD |
|---|---|
| 1 | [K]<NAME>MATSUURA... |
| 2 | [K]<NAME>MATSUURA... |
| 3 | |

F I G. 2 6

CONTENTS OF TEXT DATA TO BE SEARCHED ACCORINDG TO SECOND EMBODIMENT

```
···MASATAKA MATSUURA···WASEDA UNIVERSITY···KANAGAWA PREF. ········MALE[K][R]
···YOKO TAJIMA···TSUKUBA UNIVERSITY···ISHIKAWA PREF. ········FEMALE[K][R]
SHIRO ABE······KYUSYU UNIVERSITY···OITA PREF. ········MALE[K][R]
```

(NOTE) [R]:RECORD DELIMITER, [K]:ITEM DELIMITER

F I G. 2 7

KEYWORD VARIABLE TABLE

| KEYWORD VARIABLE | CHARACTER STRING TO BE RETRIEVED | HIT FLAG |
|---|---|---|
| A1 | MASATAKA MATSUURA | 0 |
| A2 | WASEDA UNIVERSITY | 0 |
| A3 | TSUKUBA UNIVERSITY | 0 |
| A4 | KANAGAWA PREF. | 0 |
| A5 | MALE | 0 |
| A6 | OITA PREF. | 0 |

RETRIEVAL REQUEST TABLE

| | ITEM TAG | WORD TO BE RETRIEVED |
|---|---|---|
| RETRIEVAL REQUEST A | A | MASATAKA MATSUURA |
| | B | WASEDA UNIVERSITY |
| | RETRIEVAL CONDITION EXPRESSION | A and B |
| RETRIEVAL REQUEST B | A | TSUKUBA UNIVERSITY |
| | B | KANAGAWA PREF. |
| | RETRIEVAL CONDITION EXPRESSION | A or B |
| RETRIEVAL REQUEST C | A | MALE |
| | B | OITA PREF. |
| | RETRIEVAL CONDITION EXPRESSION | A and B |

F I G. 2 8

KEYWORD VARIABLE TABLE

| KEYWORD VARIABLE | CHARACTER STRING TO BE RETRIEVED | HIT FLAG |
|---|---|---|
| A1 | MASATAKA MATSUURA | 1 |
| A2 | WASEDA UNIVERSITY | 1 |
| A3 | TSUKUBA UNIVERSITY | 0 |
| A4 | KANAGAWA PREF. | 1 |
| A5 | MALE | 1 |
| A6 | OITA PREF. | 0 |

FIG. 30A

RETRIEVAL REQUEST EXPRESSION VARIABLE TABLE

| EXPRESSION VARIABLE | RETRIEVAL LOGIC EXPRESSION | LAST EXPRESSION VARIABLE ID | HIT FLAG |
|---|---|---|---|
| Z1 | A1 and A2 | 1 | 1 |
| Z2 | A3 or A4 | 2 | 1 |
| Z3 | A5 and A6 | 3 | 0 |

FIG. 30B

RETRIEVAL RESULT TABLE

| LAST EXPRESSION VARIABLE ID | CONTENTS OF HIT RECORD |
|---|---|
| 1 | MASATAKA MATSUURA··· ··· |
| 2 | MASATAKA MATSUURA··· ··· |
| 3 | |

FIG. 31

PATTERN RETRIEVING METHOD, PATTERN RETRIEVAL APPARATUS, COMPUTER-READABLE STORAGE MEDIUM STORING PATTERN RETRIEVAL PROGRAM, PATTERN RETRIEVAL SYSTEM, AND PATTERN RETRIEVAL PROGRAM

BACKGROUND OF THE INVENTION

1. Field of the Invention

The present invention relates to the pattern retrieving technology for retrieving a pattern from a search object, and more specifically to the pattern retrieving technology for collectively and simultaneously processing retrieval requests when the retrieval requests are received from a plurality of terminal devices, and returning retrieval results to respective terminal devices, thereby exceedingly shortening the entire processing time.

2. Description of the Related Art

Conventionally, a full text retrieval system has been adopted using a character string collating method. A full text retrieval system using a character string collating method refers to a system of checking whether or not there is a specified character string in the text data to be searched while sequentially collating the specified character string with text data to be searched from the start to the end of the text data to be searched.

However, in the full text retrieval system using the character string collating method, the CPU of the system performs a collating operation while the CPU of the system is scanning the text data. Therefore, any other processes cannot be performed during the collating operation, and it is difficult for a system, in which a plurality of user terminals are connected to a retrieval device, to provide a retrieving service to the plurality of user terminals.

That is, when a plurality of user terminals are connected to a retrieval device which performs a full text searching process, and each of the user terminals frequently issues a retrieval request to the device, the CPU of the retrieval device which has started a retrieving process cannot perform other processes during the text scanning operation, and all other requests are kept waiting until the CPU has completed the character collating operation.

Furthermore, there has been the problem that, when retrieval device receives the same retrieval requests from different user terminals at almost the same time, it has to wastefully repeat the same retrieving process for the retrieval requests.

SUMMARY OF THE INVENTION

The present invention has been developed to solve the above mentioned problems, and aims at providing a retrieving method, a retrieval device, a computer-readable storage medium storing a retrieval program, a retrieval system, and a retrieval program capable of returning to each user terminal a retrieval result in almost the same response time as in the case where one user terminal is connected to one retrieval device although retrieval requests are continuously transmitted from a plurality of user terminals to a retrieval device which is connected to the plurality of user terminals and carries out a full text search.

The present invention also aims at providing a retrieving method, a retrieval device, a computer-readable storage medium storing a retrieval program, a retrieval system, and a retrieval program capable of performing a retrieving process without performing wasteful retrieving processes when the same retrieval requests are received from different user terminals at almost the same time.

The pattern retrieval apparatus according to the present invention is connected to a plurality of terminal devices through a network, and includes a retrieval target data storage unit, a retrieval condition reception unit, a retrieval condition buffer unit, a retrieving process determination unit, a retrieval pattern variable table generation unit, a retrieval request expression variable table generation unit, a retrieval unit, and a transmission unit.

According to the first aspect of the present invention, the retrieval target data storage unit stores data to be searched. The retrieval condition reception unit receives the retrieval condition, transmitted from each of the plurality of terminal devices together with the terminal device information for designation of each of the terminal devices, including the retrieval pattern and the retrieval expression for retrieval of the data to be searched. The retrieval condition buffer unit stores the retrieval condition and the terminal device information received by the retrieval condition reception unit. The retrieving process determination unit determines whether or not the preceding retrieving process is being performed. When the retrieving process determination unit determines that the preceding retrieving process is not being performed, the retrieval pattern variable table generation unit generates a retrieval pattern variable table in which a retrieval pattern and a first variable having the retrieval pattern as a value are associated with each other, if there are two or more identical retrieval patterns in the retrieval patterns stored in the retrieval condition buffer units, excluding the retrieval patterns other than one retrieval pattern. The retrieval request expression variable table generation unit generates a retrieval request expression variable table in which the retrieval request expression indicating the retrieval pattern using the first variable and the second variable having the retrieval request expression as a value are associated, and the retrieval request expression indicating the terminal device information and the retrieval expression using the second variable and the second variable having the retrieval request expression as a value are associated based on the retrieval expression and the terminal device information stored in the retrieval condition buffer unit, and the retrieval pattern variable table generated by the retrieval pattern variable table generation unit. The retrieval unit extracts a retrieval result matching the retrieval condition transmitted from each of the plurality of terminal devices by searching the retrieval target data storage unit according to the retrieval request expression variable table generated by the retrieval request expression variable table generation unit. The transmission unit transmits the retrieval result extracted by the retrieval unit to each of the plurality of terminal devices.

BRIEF DESCRIPTION OF THE DRAWINGS

FIG. 1 shows the configuration of the function of the pattern retrieval system to which the present invention is applied;

FIG. 4 shows a determination table of the determination 1 shown in FIG. 3;

FIG. 5A shows a Deltal table used in the EBM method;

FIG. 5B shows a table for determination of the right end of a pattern;

FIG. 6 shows an example of an 'erroneous read' of Japanese text;

FIG. 10 shows an example of the contents of text data to be searched;

FIG. 11 shows an example of a retrieval request;

FIG. 21 shows the concept of the keyword variable table generating process according to the first embodiment;

FIG. 24A shows an example (1) of a keyword variable table according to the first embodiment of the present invention;

FIG. 24B shows an example (1) of a retrieval request expression variable table according to the first embodiment of the present invention;

FIG. 25A shows an example (2) of a keyword variable table according to the first embodiment of the present invention;

FIG. 25B shows an example (2) of a retrieval request expression variable table according to the first embodiment of the present invention;

FIG. 26 shows an example of a retrieval result table according to the first embodiment of the present invention;

FIG. 27 shows the contents of the text data to be searched according to the second embodiment of the present invention;

FIG. 28 shows the concept of the keyword variable table generating process according to the second embodiment of the present invention;

FIG. 30A shows an example of the keyword variable table generating process according to the second embodiment of the present invention;

FIG. 30B shows an example of a retrieval request expression variable table according to the second embodiment of the present invention;

FIG. 31 shows an example of a retrieval result table according to the second embodiment of the present invention.

DESCRIPTION OF THE PREFERRED EMBODIMENTS

Figure 2:
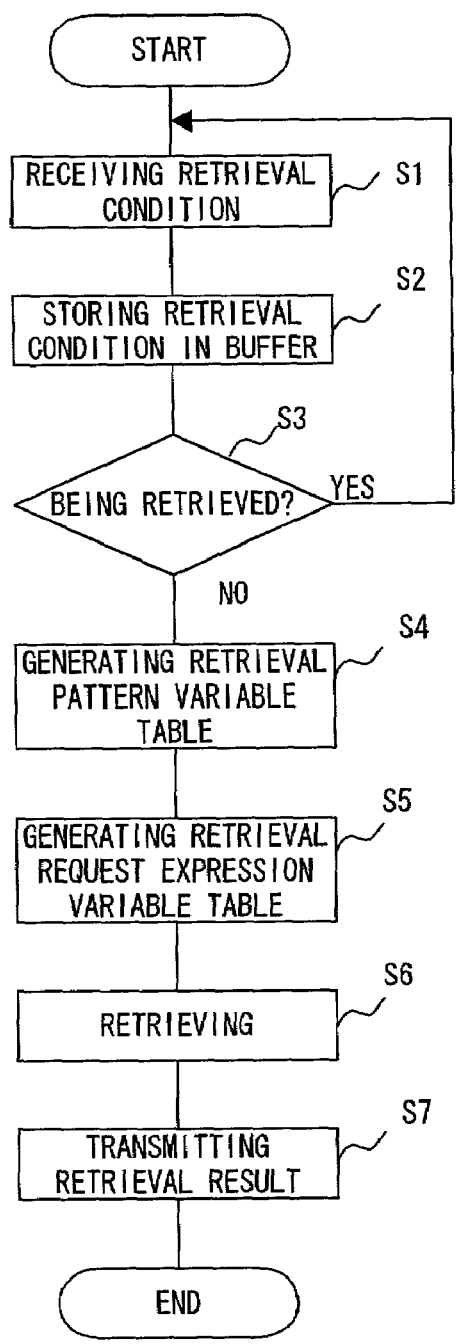
FIG. 2 is a flowchart of the pattern retrieving process performed by a pattern retrieval apparatus 4 explained by referring to FIG. 1.

The embodiments of the present invention are described below in detail by referring to the attached drawings.

To solve the problem, the present invention adopts the following configurations.

That is, according to an embodiment of the present invention, in a pattern retrieval system in which a plurality of terminal devices are connected to a pattern retrieval apparatus through a network, the pattern retrieving method, the pattern retrieval apparatus, the computer-readable storage medium storing a pattern retrieval program, the pattern retrieval system, and the pattern retrieval program according to the present invention receive the retrieval condition containing a retrieval pattern for retrieval of data to be searched and a retrieval expression transmitted from each of the above mentioned plurality of terminal devices together with the terminal device information for designation of each of the terminal device, store the received retrieval condition and terminal device information in the retrieval condition buffer, determines whether or not the preceding retrieving process is being performed, generates, when it is determined that the preceding retrieving process is not being performed, a retrieval pattern variable table in which a retrieval pattern and a first variable having the retrieval pattern as a value are associated with each other, if there are two or more identical retrieval patterns in the retrieval patterns stored in the retrieval condition buffer, excluding the retrieval patterns other than one retrieval pattern, generates a retrieval request expression variable table in which the retrieval request expression indicating the retrieval pattern using the first variable and the second variable having the retrieval request expression as a value are associated, and the retrieval request expression indicating the terminal device information and the retrieval expression using the second variable and the second variable having the retrieval request expression as a value are associated based on the retrieval expression and the terminal device information stored in the retrieval condition buffer, and the generated retrieval pattern variable table, extracts a retrieval result matching the retrieval condition transmitted from each of the plurality of terminal devices by searching the retrieval target database according to the generated retrieval request expression variable table, and transmits the extracted retrieval result to each of the plurality of terminal devices.

Thus, when there are a number of retrieval requests in a short time, the process can be performed at a much higher speed than in the conventional technology.

Furthermore, it is desired that the retrieval condition is stored in the retrieval condition buffer until it is determined that the retrieving process being performed bas been completed.

It is also desired that the retrieval condition buffer stores the retrieval condition until a predetermined time is reached or a predetermined capacity is filled.

It is also desired that the above mentioned retrieval is performed by simultaneously retrieving a plurality of retrieval patterns.

Furthermore, it is desired that the above mentioned retrieval is performed in the Aho-Corasick (AC) method, the Expanded-Boyer-Moore (EBM) method, or the Shinohara-Arikawa (SA) method.

FIG. 1 shows the configuration of the function of the pattern retrieval apparatus to which the present invention is applied.

In FIG. 1, a pattern retrieval system 1 comprises a plurality of terminal devices 3 connected to the pattern retrieval apparatus 4 through a electric communications circuit 2.

Each of the terminal devices 3 comprises a terminal device side transmission unit 31, and a terminal device side reception unit 32.

The pattern retrieval apparatus 4 comprises a retrieval target data storage unit (database) 41, a retrieval condition reception unit 42, a retrieval condition buffer unit 43, a retrieving process determination unit 44, a retrieval pattern variable table generation unit 45, a retrieval pattern variable table 46, a retrieval request expression variable table generation unit 47, a retrieval request expression variable table 48, a retrieval unit 49, and a transmission unit 50.

The terminal device side transmission unit 31 transmits the retrieval condition containing a retrieval pattern for retrieval of data to be searched and a retrieval expression together with the terminal device information for designation of the terminal device 3.

The retrieval target data storage unit 41 stores the data to be searched.

The retrieval condition reception unit 42 receives the retrieval condition, transmitted from the terminal device side transmission unit 31 of each of the plurality of terminal devices 3 together with the terminal device information for designation of each of the terminal devices 3, including the retrieval pattern and the retrieval expression for retrieval of the data to be searched.

The retrieval condition buffer unit 43 stores the retrieval condition and the terminal device information received by the retrieval condition reception unit 42. For example, the retrieval pattern is stored until the retrieving process determination unit 44 determines that the retrieving process bas been completed, or until a predetermined time is reached or a predetermined capacity is filled.

The retrieving process determination unit 44 determines whether or not the preceding retrieving process is being performed.

When the retrieving process determination unit 44 determines that the preceding retrieving process is not being performed, the retrieval pattern variable table generation unit 45 generates a retrieval pattern variable table 46 in which a retrieval pattern and a first variable having the retrieval pattern as a value are associated with each other, if there are two or more identical retrieval patterns in the retrieval patterns stored in the retrieval condition buffer units 43, excluding the retrieval patterns other than one retrieval pattern.

The retrieval request expression variable table generation unit 47 generates a retrieval request expression variable table 48 in which the retrieval request expression indicating the retrieval pattern using the first variable and the second variable having the retrieval request expression as a value are associated, and the retrieval request expression indicating the terminal device information and the retrieval expression using the second variable and the second variable having the retrieval request expression as a value are associated based on the retrieval expression and the terminal device information stored in the retrieval condition buffer unit 43, and the retrieval pattern variable table 46 generated by the retrieval pattern variable table generation unit 45.

The retrieval unit 49 extracts a retrieval result matching the retrieval condition transmitted from each of the plurality of terminal devices by searching the retrieval target data storage unit according to the retrieval request expression variable table 48 generated by the retrieval request expression variable table generation unit 47. In a retrieving method, a plurality of retrieval patterns can be retrieved. For example, the Aho-Corasick (AC) method, the Expanded-Boyer-Moore (EBM) method, or the Shinohara-Arikawa (SA) method can be used. These AC, EBM, and SA methods are briefly described later.

The transmission unit 50 transmits the retrieval result extracted by the retrieval unit 49 to each of the plurality of terminal devices 3.

The terminal device side reception unit 32 receives a result transmitted from the transmission unit 50.

FIG. 2 is a flowchart of the pattern retrieving process performed by the pattern retrieval apparatus 4 described by referring to FIG. 1.

When the process is started, first in step S1, the retrieval condition reception unit 42 of the pattern retrieval apparatus 4 receives the retrieval condition including a retrieval pattern for retrieval of data to be searched and a retrieval expression transmitted from the terminal device side transmission unit 31 of each of the plurality of terminal devices 3 together with terminal device information for designation of each terminal device 3.

In step S2, the retrieval condition buffer unit 43 of the pattern retrieval apparatus 4 temporarily stores the received retrieval condition and terminal device information in the buffer memory.

In step S3, the retrieving process determination unit 44 of the pattern retrieval apparatus 4 determines whether or not the preceding retrieving process is being performed.

If it is being performed (YES in step S3), then control is returned to step S1, another retrieval conditions, etc. are received from the terminal device side transmission unit 31, and temporarily stored in the buffer memory (step S2). The reception (step S1) and the storage (step S2) are repeated until it is determined in step S3 that the preceding retrieving process has been completed by the retrieving process determination unit 44. Although it is determined that the preceding retrieving process has been completed, the above mentioned retrieval condition, etc. can be received/stored until a predetermined time is reached or a predetermined capacity is filled.

On the other hand, if it is determined in step S3 that a retrieving process is not being performed (that the preceding retrieving process has been completed) (NO in step S3), then, in step S4, the retrieval pattern variable table generation unit of the pattern retrieval apparatus 4 generates a retrieval pattern variable table 46 in which a retrieval pattern and a first variable having the retrieval pattern as a value are associated with each other, if there are two or more identical retrieval patterns in the retrieval patterns stored in the retrieval condition buffer units 43, excluding the retrieval patterns other than one retrieval pattern.

Then, in step S5, the retrieval request expression variable table generation unit 47 of the pattern retrieval apparatus 4 generates a retrieval request expression variable table 48 in which the retrieval request expression indicating the retrieval pattern using the first variable and the second variable having the retrieval request expression as a value are associated, and the retrieval request expression indicating the terminal device information and the retrieval expression using the second variable and the second variable having the retrieval request expression as a value are associated based on the retrieval expression and the terminal device information stored in the buffer memory, and the generated retrieval pattern variable table 46 generated by the retrieval pattern variable table generation unit 45.

Then, in step S6, the retrieval unit 49 of the pattern retrieval apparatus 4 extracts (retrieves) a retrieval result matching the retrieval condition transmitted from each of the plurality of terminal devices 3 by searching the retrieval target data storage unit 41 according to the generated retrieval request expression variable table 48 in the method of simultaneously retrieving a plurality of retrieval patterns, that is, the AC, EBM, or SA method.

Finally, in step S7, the transmission unit 50 of the pattern retrieval apparatus 4 transmits the extracted retrieval result to each of the plurality of terminal devices 3. The terminal device side reception unit 32 of the terminal device 3 receives the above mentioned retrieval result.

Briefly described below are the above mentioned AC, EBM, and SA methods.

First, the AC method is briefly described. The AC method is described in detail in the reference 1 (Aho. A. V. and Corasick. M. J., 'Efficient String Matching: An Aid to Bibliographic Search', Comm.ACM, vol.18, no.6, pp.33–340, 1975).

The AC method is an algorithm of a pattern matching engine devised by Alfred Aho and Margaret Corasick, the authors of the above mentioned reference 1. In this method, character strings to be searched can be detected only in one searching process from start to end.

Described below is the basic logic of detecting a character string to be retrieved from character string to be searched according to the AC algorithm.

Normally, in the information processing technology, a character string is actually expressed by an array of binary values referred to as bits represented by 0 or 1. A character string is an array of binary numbers if it is decomposed in a bit unit, but it is an array of hexadecimal numbers if it is decomposed in 4-bit units, or an array of the 256-number numeration if it is decomposed in 4-bit units.

In this example, the basic logic of the AC algorithm is described with a character string processed as an array of hexadecimal numbers.

First, there are three words to be retrieved, that is, '富士(9578 8E6D)' (two Japanese characters (their respective character codes)), '瞬索(8F75 8DF5)' (two Japanese characters (their respective character codes)), and '高速(8D82 91AC)' (two Japanese characters (their respective character codes)). The numbers enclosed by the parentheses are the hexadecimal representation of the words to be retrieved.

Assume that the character string to be searched is '富士の瞬索は超高速(9578 8E6D 82CC 8F75 8DF5 82CD 92B4 8D82 91AC)' (nine Japanese characters (their respective character codes)) with 'の (82CC)' (one Japanese character (its character code)), 'は (82CD)' (one Japanese character (its character code)), and '超 (92B4)' (one Japanese character (its character code)).

Figure 3:
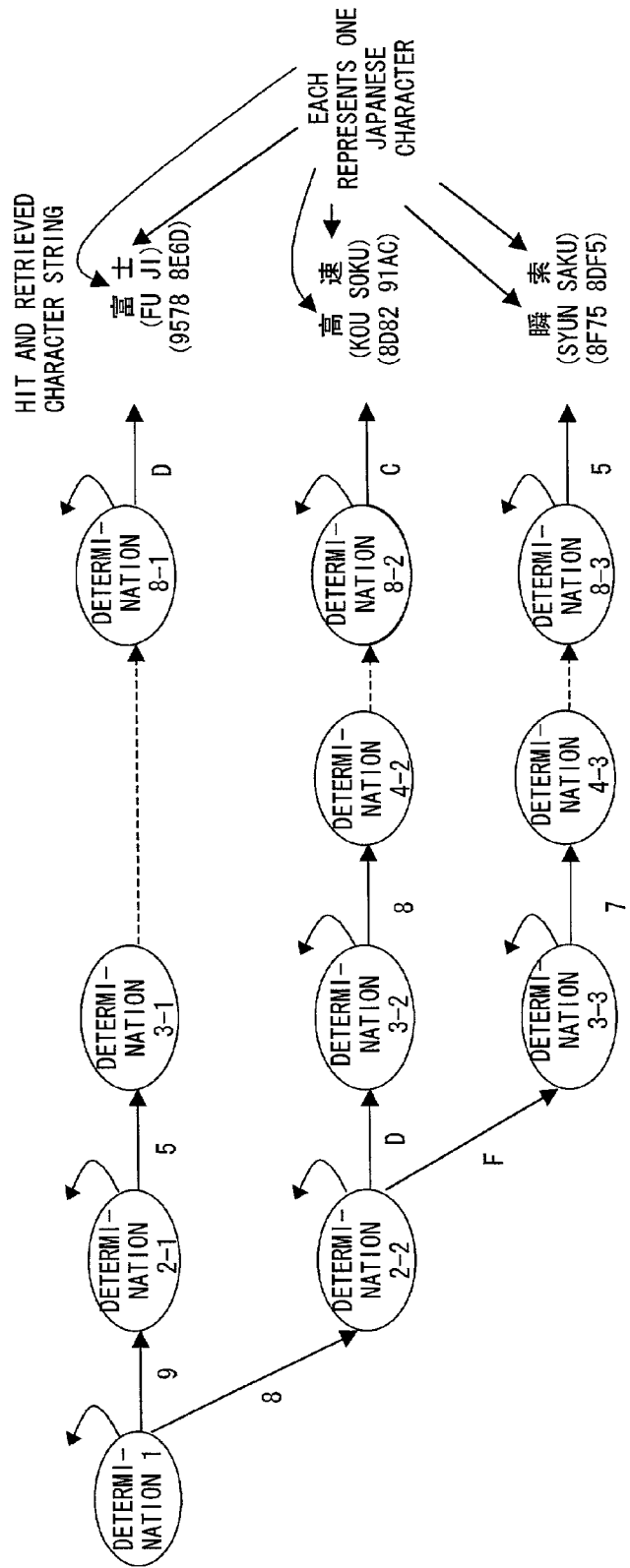
FIG. 3 shows a state transition table in the AC method.

The pattern matching engine first generates a state transition table as shown in FIG. 3 based on the above mentioned words to be retrieved.

In FIG. 3, it is determined in 'determination 1' whether or not an arbitrary 4 bits (the n-th four bits in the character string to be searched is 9 or 8, or neither 9 or 8. If it is 9, the determination 2-1 is performed. If it is 8, the determination 2-2 is performed. Otherwise, the determination 1 is performed on the (n+1)th four bits.

In the determination 2-1, it is determined whether or not the (n+1)th four bits refer to 5 or any of other numbers. If it is 5, the determination 3-1 is performed on the (n+2)th four bits. Otherwise, the determination 1 is performed on the (n+1)th four bits.

Similarly, the determination is sequentially continued in 4-bit units.

In the above mentioned process, if the determination 8-1 is performed and the determined four bits refer to D, then the word to be retrieved '富士' (two Japanese characters (their respective character codes)) has been successfully retrieved. If the determination 8-2 is performed and the determined four bits refer to C, then the word to be retrieved '高速' (two Japanese characters (their respective character codes)) has been successfully retrieved. If the determination 8-3 is performed and the determined four bits refer to 5, then the word to be retrieved '瞬索' (two Japanese characters (their respective character codes)) has been successfully retrieved.

There are three words to be retrieved, that is, '富士' (two Japanese characters (their respective character codes)), '高速' (two Japanese characters (their respective character codes)), and '瞬索' (two Japanese characters (their respective character codes)), but the determination is not performed three times in the determination 1. Actually, the determination is performed twice whether the word refers to 9 or 8. However, since the determination is performed whether the word refers to D or F in the determination 2-2. Therefore, although the determination frequency reduction in the determination 1 seems to be insignificant, the determination frequency can be practically reduced if the result of the determination 1 is not 8 because, in this case, the determination 2-2 can be skipped. If the probability of the occurrence of each value is equal, then the probability of the occurrence of 8 is $1/16$, thereby obtaining the probability of performing the determination 2-2 is also $1/16$.

In the scope of the above mentioned explanation, the character string collating time more or less depends on the number of words to be retrieved although the determination frequency is actually reduced. Especially, when the number of words to be retrieved is small, the determination frequency reduction effect is also small.

However, each determining process can be efficiently performed in the following method.

In each determining process, a determination table as shown in FIG. 4 is used. FIG. 4 shows the determination table for the determination 1. In FIG. 4, if the 4-bit value to be determined is 9, then the following four bits are determined according to the determination table of the determination 2-1. Otherwise, the following four bits are determined according to the determination table of the determination 1.

The determination is carried out as described below according to the determination table.

Using the above mentioned character string to be searched, the first value is 9. Therefore, the column containing 9 as a 4-bit value to be determined on the determination table is directly checked, and control is passed to the determination table of the determination 2-1. That is, whatever the contents of the determination table are, all the user has to do is to check the column only. Therefore, the determining time on the determination table does not depend on the number of the words to be retrieved.

Afterwards, by scanning the character string to be searched according to the determination table, the collation between the entire character string to be searched and the entire word to be retrieved can be completed in one scanning operation.

When there is a hit on the last determination table, the collation result information such as a hit character string, the positional information about the character string, etc. is stored in the destination table column. When control is passed to the table, the collation result information is retrieved.

In the above mentioned explanation, a character is segmented in a 4-bit unit, and then a determination table is generated. If a character is segmented in a 8-bit unit, the probability of the transition to the next determination table is 1/256, thereby further reducing the processing time.

Although the time required to generate a state transition table is added to a retrieving process, the time is considerably shorter than a normal retrieving time. Therefore, it little affects the entire processing time.

Described briefly below is the EBM method.

The EBM method is an algorithm obtained by extending the BM (Boyer-Moore) method such that a plurality of patterns can be processed. In the EMB method, like in the AC method, a plurality of patterns can be detected by scanning the text in one operation only. As compared with the AC method, the EBM method requires a smaller work area with relatively high efficiency.

Described first is the outline of the BM method. In the BM method, a character string to be searched is collated with a pattern from the end to the start of the pattern. If a non-matching result is output in the collating process, the collation position of the character string to be searched is shifted backward, and the collation is resumed from the end of the pattern. The process is repeatedly performed until the collation position reaches the end of the character string to be searched. How many characters have to be backward skipped for collation when a non-matching result is output can be uniquely determined by the character of the character string to be searched at which the non-matching result is output. Based on a given pattern, a correspondence table of a character to the number of skipped characters can be generated.

For example, when the pattern 'ABCD' is given, the table is a DELTA1 table (one-dimensional array of non-zero integers) such as del_abcd shown in FIG. 5A. The upper columns refer to the characters of the character string to be searched when a non-matching result is output in the collating process, and the lower columns indicate how many characters the collation position has to skip backwards. The value of the trailing character of the pattern in the lower column is set to 0. The value of the character not existing in the pattern in the lower columns refers to the number of characters of the pattern. When the collating process is performed, the trailing character of the pattern and the character at the collation position in the character string to be searched are first retrieved, and the value of the character corresponding to the character in the lower column on the delta1 table is checked. If the value is 0, then the character matches the trailing character of the pattern. Therefore, the collating process is performed forward. If the value in the lower column is equal to or larger than 1, then the trailing character of the pattern is collated with the collation positions of the character string to be searched and the pattern shifted backward by the number of characters indicated by the value. The collating process is completed after the above mentioned process is repeated until the collation position reaches the end of the character string to be searched.

The table is used as follows in the EBM.

If two patterns 'ABCD' and 'BCDE' are given, a delta1 table (a one-dimensional array of non-negative integers) such as del_abcd and del_bcde, etc. shown in FIG. 5A is generated for each pattern. Then, these tables are combined (a smaller value in the values for the same characters is selected), and a deltal table as del_con shown in FIG. 5A is generated. When the minimum value is 0, a large value L (large: number of characters of the character string to be searched+number of characters of the pattern+1) replaces 0. The L is used for determination of the end of the collating process.

When the trailing character of the pattern is detected (when the value of deltal is large), it is to be indicated which pattern relates to the trailing character by generating the table as shown in FIG. 5B. The FIGS. (1, 2, 3) shown in FIG. 5B indicate respective patterns.

Using the del_com shown in FIG. 5A and 5B, the retrieving process can be completed in one collating process on a character string to be searched from the start to the end the character string although there are a plurality of patterns by performing the similar collating process of the BM method.

Finally, the SA method is briefly described.

The SA method is an algorithm of the case in which a pattern matching process is performed between a character string and Japanese text.

The Japanese text contains a combination of 2-byte characters and 1-byte characters. When 2-byte characters and 1-byte characters are combined, it is not possible to easily determine whether a target character code refers to a 1-byte character or a 2-byte character. That is, unless the process is performed with the segmentation of a character recognized from the start of a character string, the erroneous read occurs as shown in FIG. 6.

The above mentioned AC method and the EBM method disclose efficient methods of performing collating processes on a plurality of patterns, but do not disclose a method of efficiently solving the problem of the erroneous read. With Japanese text, any method cannot be effectively applied without solving the problem of the erroneous read. Based on the AC method, the SA method describes means for solving the problem of the erroneous read as follows.

One of the methods for solving the problem of the erroneous read is to perform a pattern matching process with the boundary between a 1-byte character and a 2-byte character constantly recognized to prevent an erroneous read. To attain this, an automaton reflecting the characteristic of a code system (shift JIS) in Japanese text is formed, and a pattern matching process is performed using it.

Figure 7:
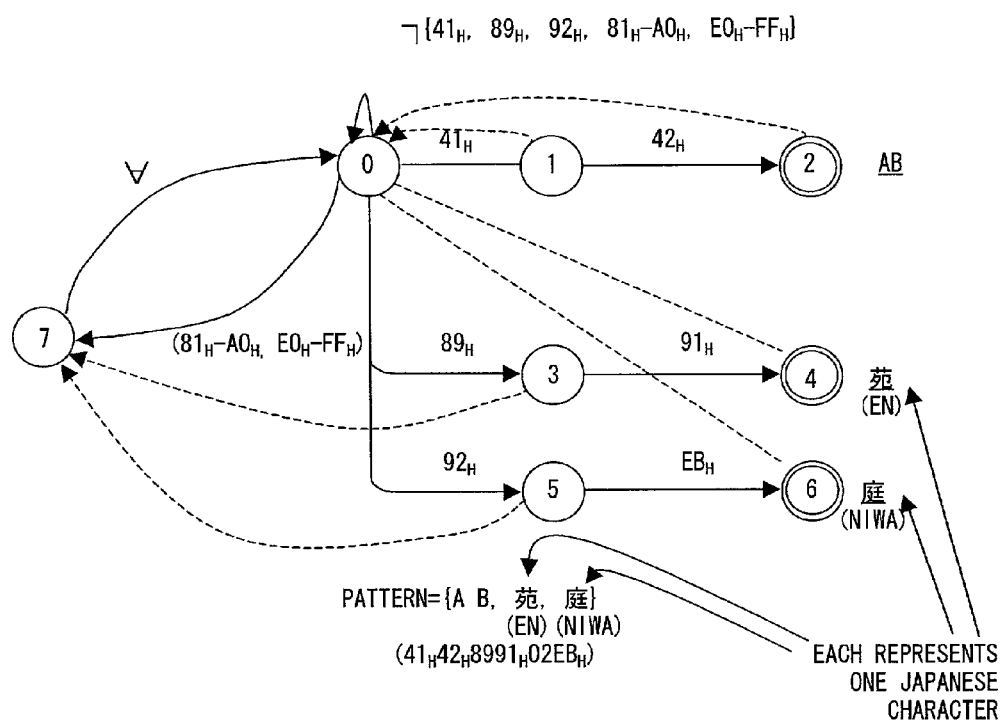
FIG. 7 shows an example of the automaton reflecting the characteristic of code system in the Japanese text.

FIG. 7 shows an example of an automaton reflecting the characteristic of a code system in Japanese text.

The automaton shown in FIG. 7 has a set of patterns {AB, 苑(one Japanese character (its character code)), 庭(one Japanese character (its character code))} as a target. The status 7 shown in FIG. 7 indicates an intermediate status toward which the broken lines of the status 3 and 5 are led. When the status 3 and 5 cannot be changed into another status, they are first led to the intermediate status 7. After adjusting the erroneous read in the intermediate status 7, the status 0 is entered. In this method, the adjustment of the erroneous read can be efficiently made in the matching process.

Figure 8:
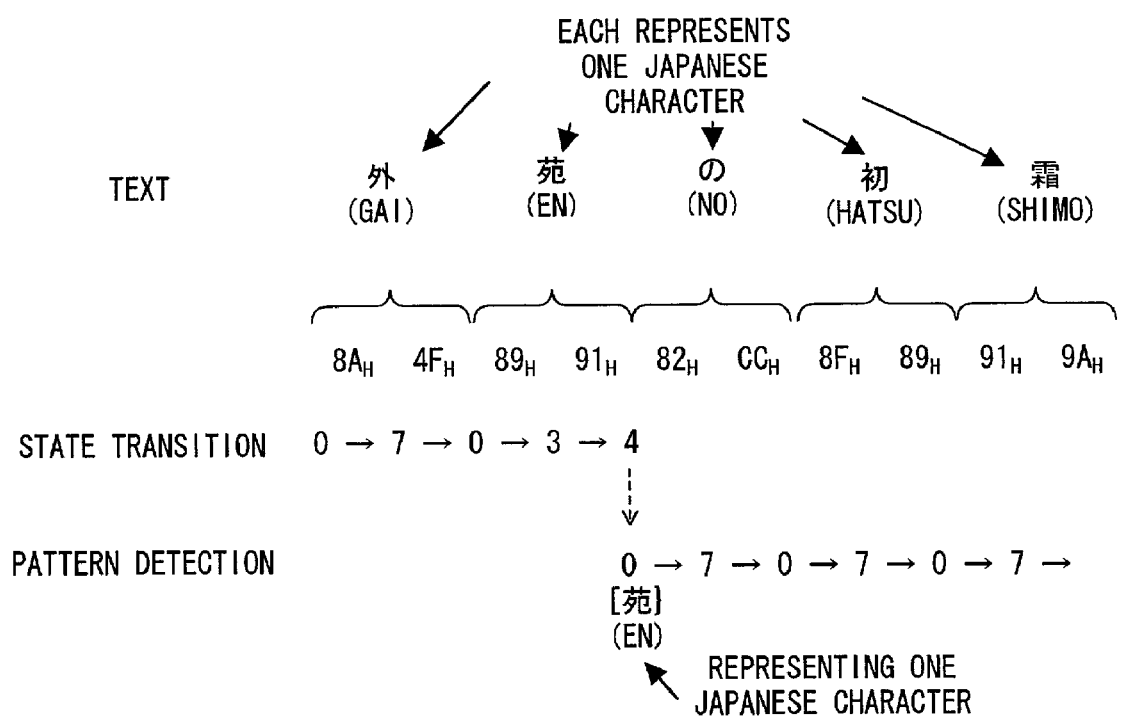
FIG. 8 shows detecting a pattern based on the state transition.

For example, when '外苑の初霜' (five Japanese characters (their respective character codes)) is given as text, the state transition shown in FIG. 8 occurs, and the pattern can be correctly detected.

The AC method and the EBM method are described in the reference document 2 ('Realizing five types of pattern matching methods using a function in C language, First case, English text', NIKKEI BYTE/AUGUST 1987). The SA method if described in the reference document 3 ('Realizing five types of pattern matching methods using a function in C language, Second case, Japanese text', NIKKEI BYTE/ SEPTEMBER 1987).

Figure 9:
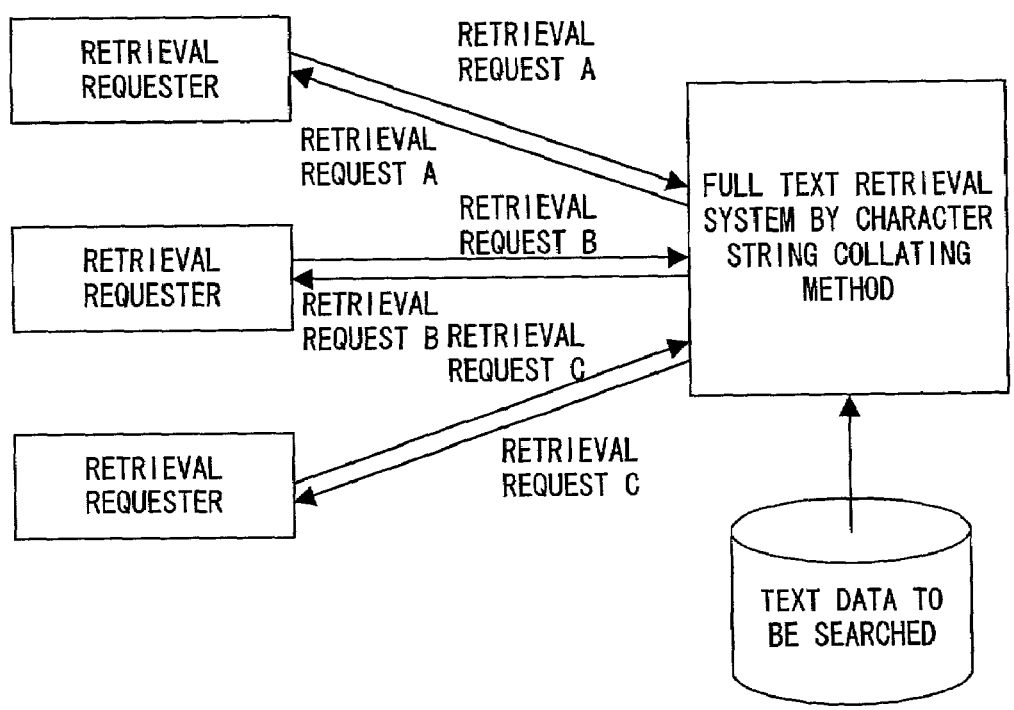
FIG. 9 shows a concept model of the full text retrieval system in the character string collating method according to the present invention.

FIG. 9 shows a concept model of the character string collating method of the full text retrieval system (hereinafter referred to as the present system).

The present system extracts the information satisfying each retrieval request from the text data to be searched in response to the retrieval requests irregularly issued from a plurality of terminals, and returns the information as a retrieval result to each terminal. FIG. 10 shows an example of the contents of the text data to be searched. The entire text data to be searched is referred to as a file. A file comprises a plurality of records, and each record comprises a plurality of items. An item contains a character string, and a record can be identified by a record delimiter. An item in a record is segmented by an item delimiter, and can be uniquely designated by an item identification code (hereinafter referred to as an item tag).

Retrieval requests are frequently received by the present system in time series. As shown in FIG. 11, each retrieval request has an array of information including a combination of an item tag and a word to be retrieved, and a retrieval condition expression. These pieces of information indicate that a specified word to be retrieved exists in the item specified by the item tag in the record to be searched, and that a request to search for a record satisfying a retrieval condition expression has been issued.

Then, the present system detects records satisfying a retrieval request in a file, and returns a part or all of the records to a retrieval requester.

The full text retrieval system using the character string collating method as shown in FIG. 9 conventionally performs a retrieving process and returns a retrieval result to a terminal each time a retrieval request is issued by the terminal. According to the present invention, a retrieving process is performed collectively for retrieval requests from a plurality of terminals, and after the retrieving process, the retrieval results are returned to the respective terminals, thereby remarkably shortening the entire processing time.

Figure 12:
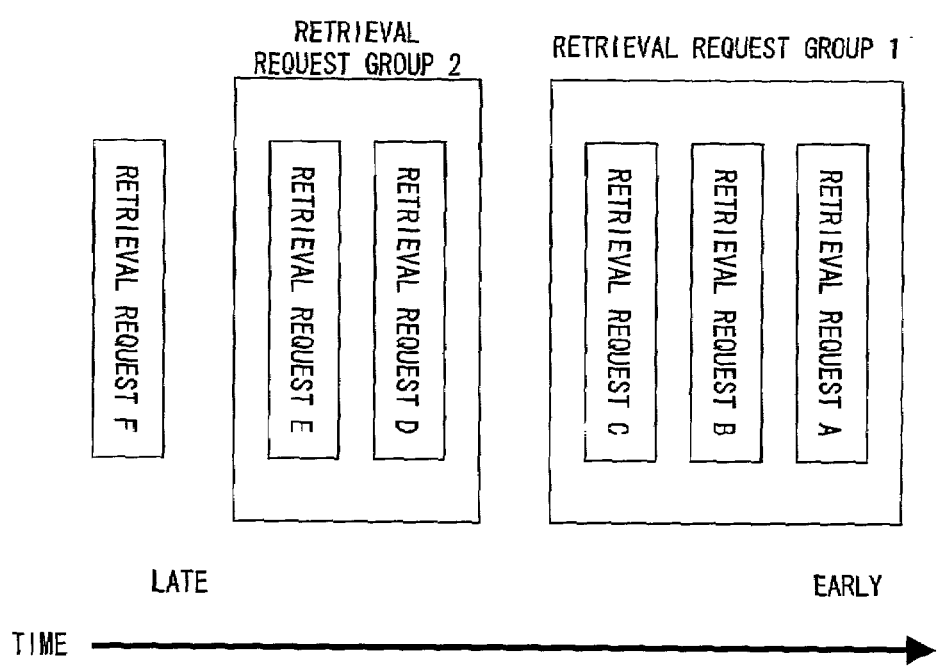
FIG. 12 shows the concept of a retrieval request group.

Although retrieval requests are frequently received by the present system in time series, each retrieval request is not individually processed, but a plurality of retrieval requests are collectively processed. A set or retrieval requests to be collectively processed is referred to as a retrieval request group. FIG. 12 shows the concept.

A retrieval request group is configured as follows.

All retrieval requests received while the present system is performing the process of a retrieval request group are kept waiting, and all retrieval requests waiting at the point where the process of the retrieval request group being processed is completed are defined as the next retrieval request group. If there are no waiting retrieval requests, a retrieval request group is configured by the first retrieval request to be received next. The number of retrieval requests contained in the first retrieval request group is one.

Figure 13:
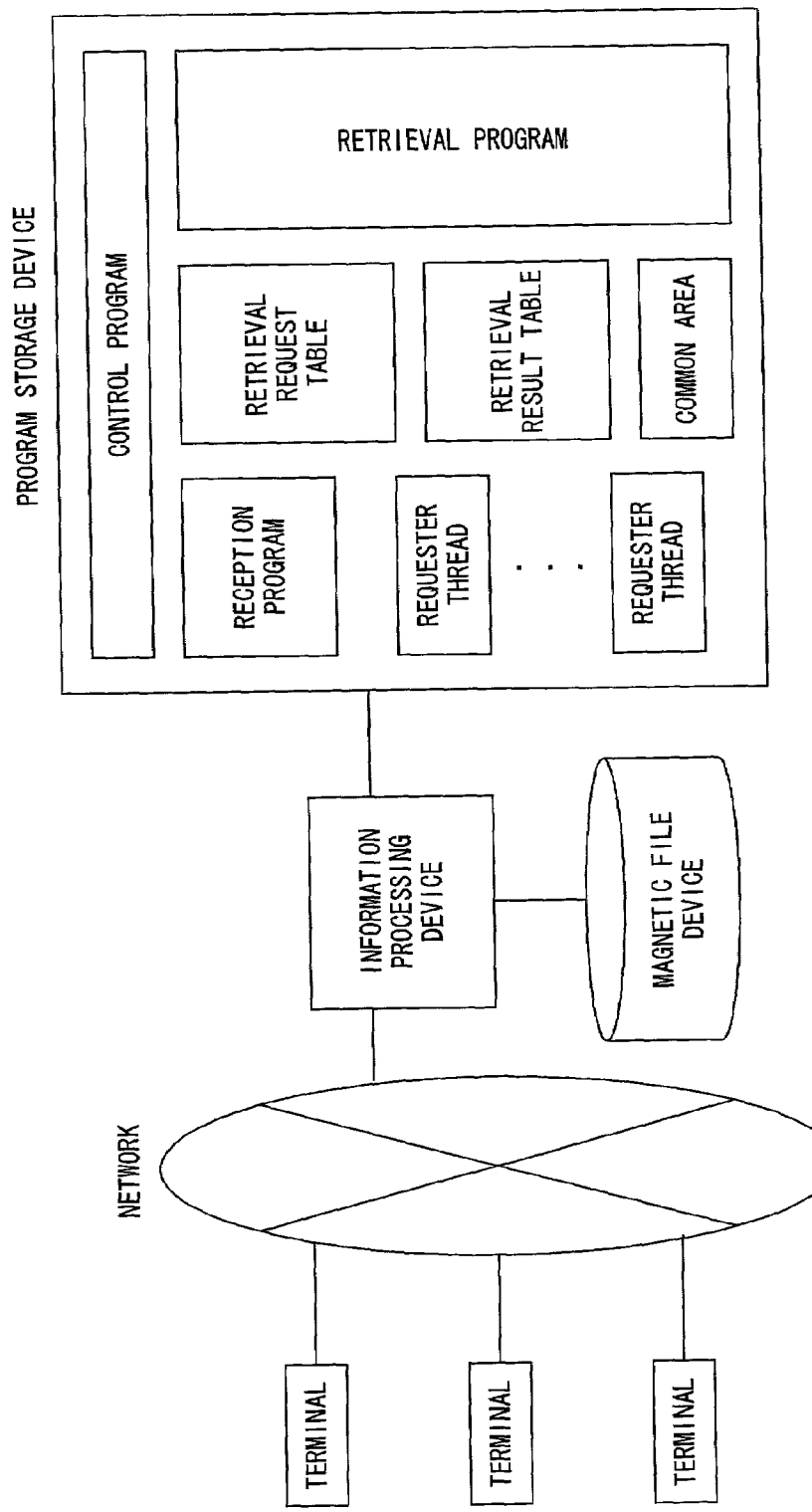
FIG. 13 shows an example of the entire configuration of the present invention.

FIG. 13 shows an example of the entire configuration according to the present invention.

The present invention is configured by an information processing device, a magnetic file device, and a program storage device. The components of the program storage device are a control program, a reception program, a requester thread, a retrieval request table, a retrieval result table and a retrieval program.

Figure 14:
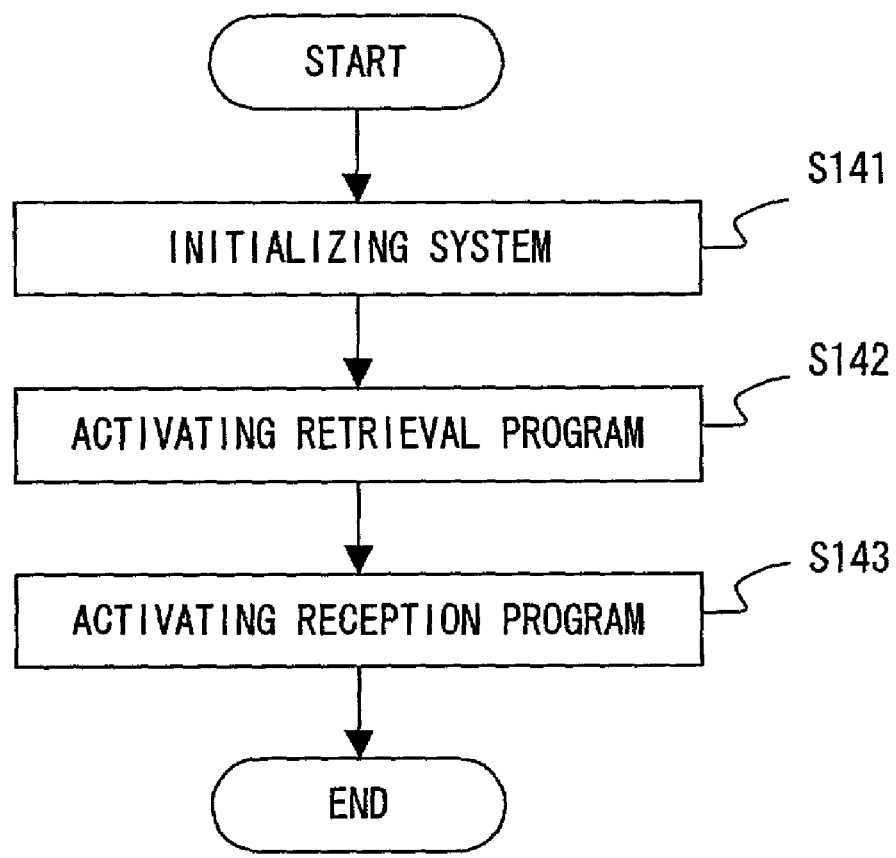
FIG. 14 is a flowchart showing the flow of the process by the control program.

FIG. 14 is a flowchart showing the flow of the process of a control program.

After performing a system initializing process on various tables, etc. (step S141), the control program is activated (step S142) and simultaneously the reception program is activated (step S143).

Figure 15:
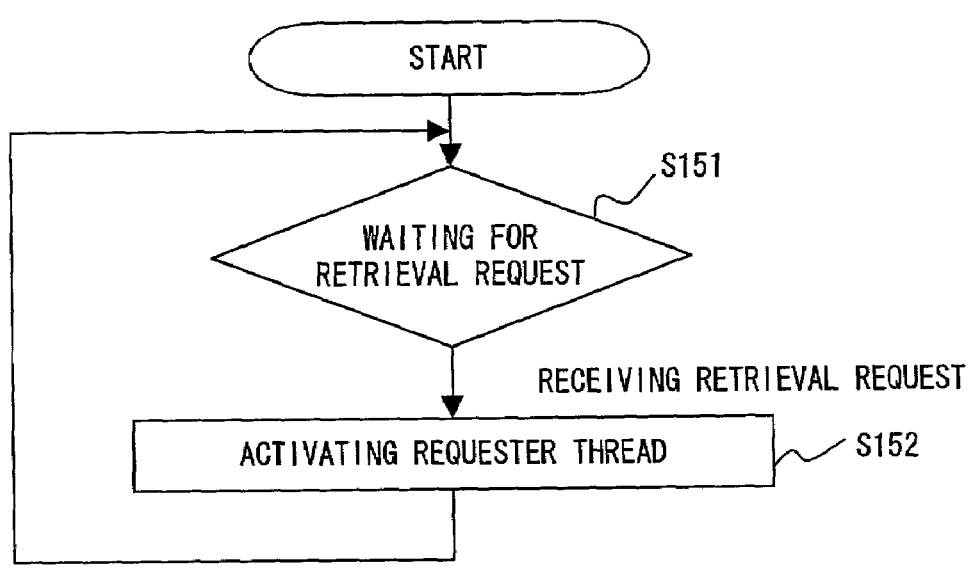
FIG. 15 is a flowchart showing the flow of the process by the reception program.

FIG. 15 is a flowchart showing the flow of the process of the reception program.

The reception program is constantly waiting a retrieval request from a terminal (step S151), and activates a requester thread each time a retrieval request is received from a terminal (step S152). The number of requester threads equals the number of retrieval requests.

Figure 16:
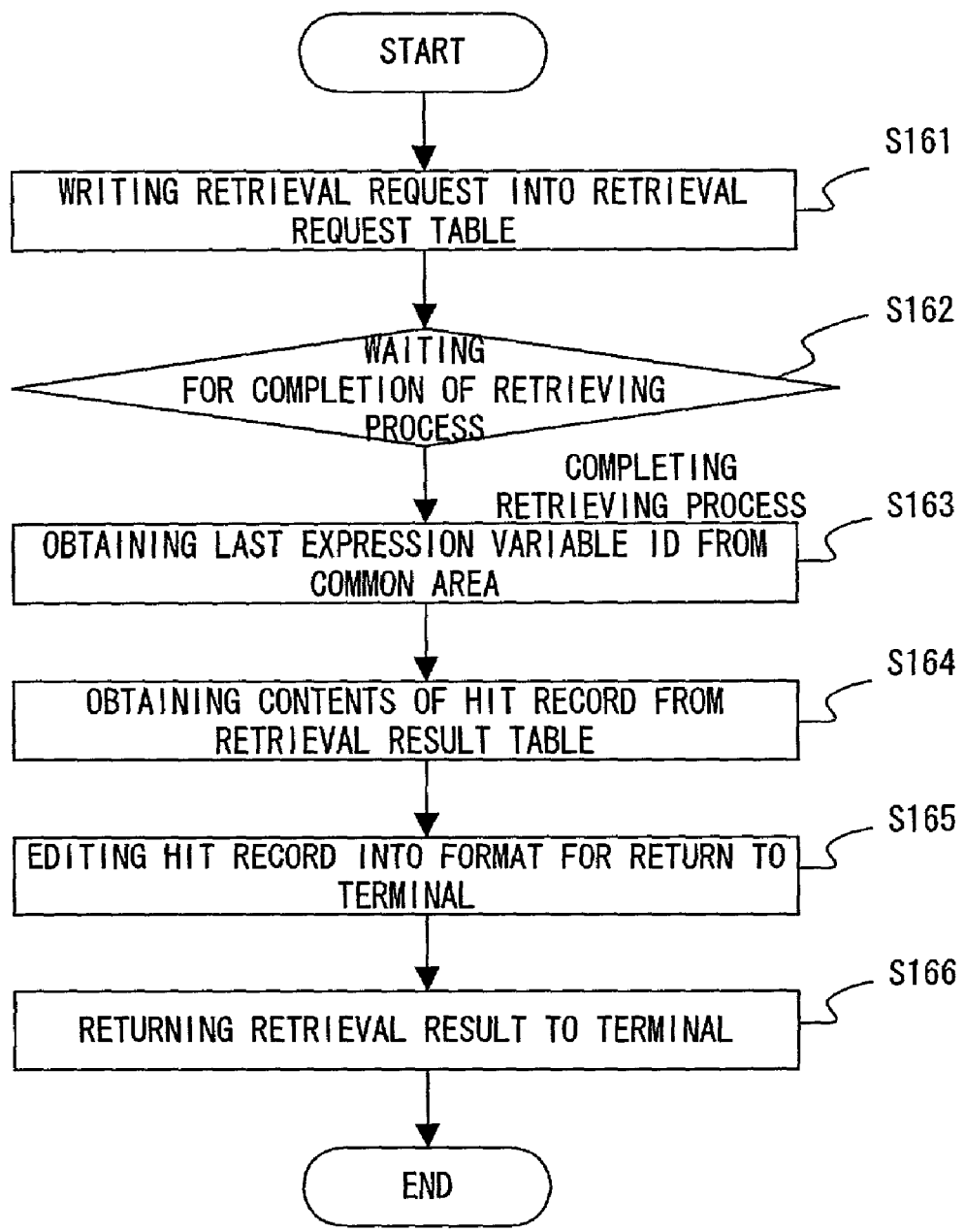
FIG. 16 is a flowchart showing the flow of the process of a requester thread.

FIG. 16 is a flowchart showing the flow of the process of a requester thread.

Figure 17:
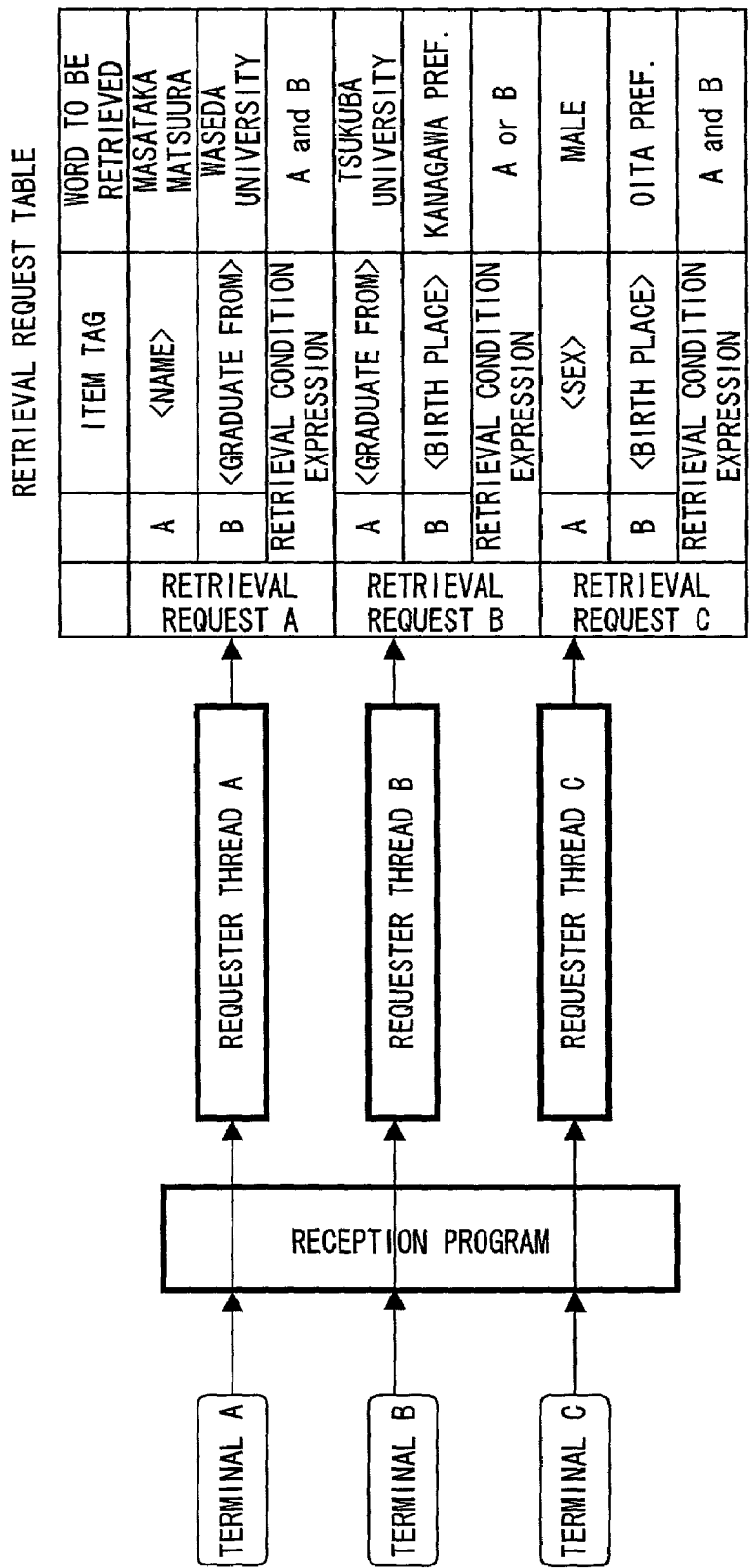
FIG. 17 shows the concept of the process of writing a retrieval request to the retrieval request table.

After being activated, the requester thread writes a retrieval request to a retrieval request table (step S161). FIG. 17 shows the concept of the process in step S161.

Figure 18:
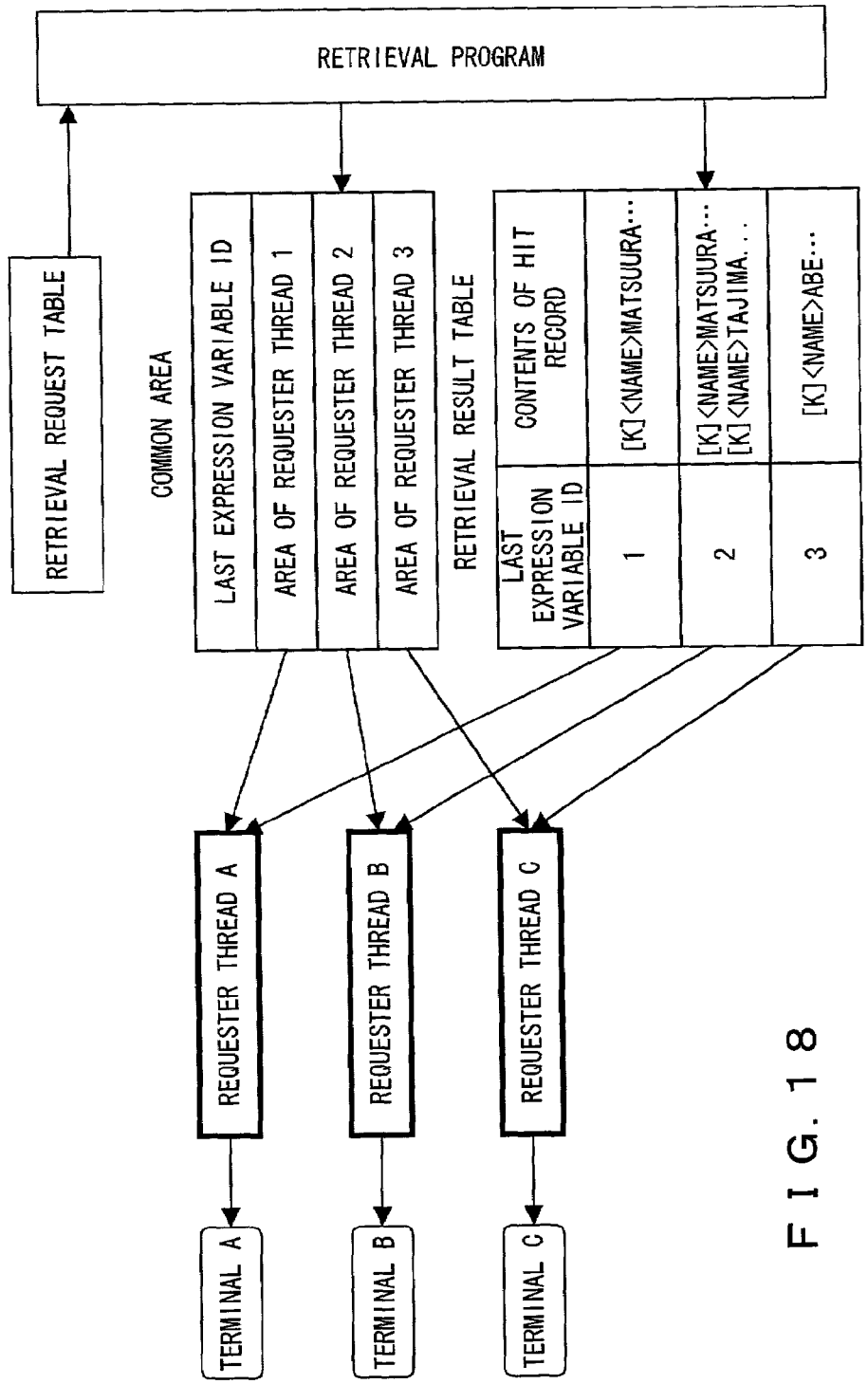
FIG. 18 shows the concept of the process of returning a retrieval result to a terminal.

Then, the requester thread enters the wait state for the completion of the retrieving process (step S162). After the retrieving process, the retrieval result is written to the retrieval result table, and the last expression variable ID indicating to which retrieval result table an answer to each requester thread has been written is written to a common area. After exiting the wait state, the requester thread refers to the last expression variable ID of its area in the common area (step S163), retrieves the contents of a hit record (step S164) from the retrieval result table, edits an answer (step S165), and returns the result to the terminal (step S166). FIG. 18 shows the concept of the processes in steps S162 through S165.

Figure 19:
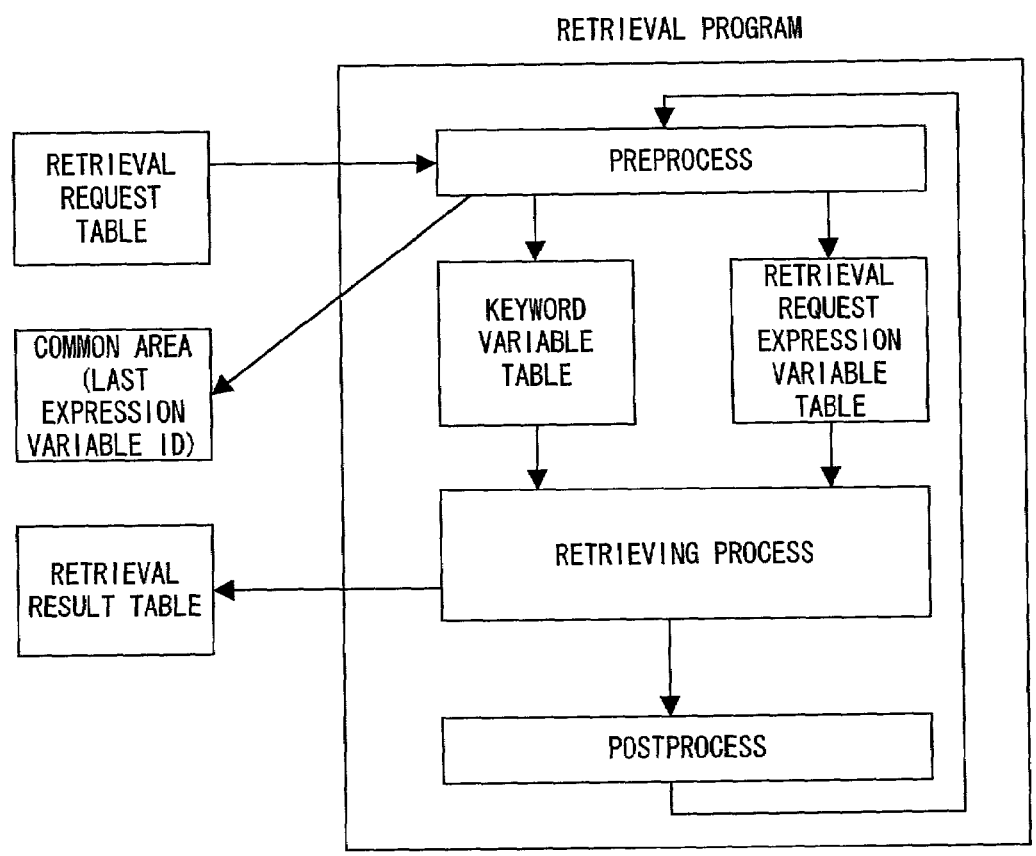
FIG. 19 shows the entire structure of the retrieval program.

FIG. 19 shows the entire structure of a retrieval program.

A retrieval program is configured by a preprocess, a retrieving process, a postprocess, etc.

Figure 20:
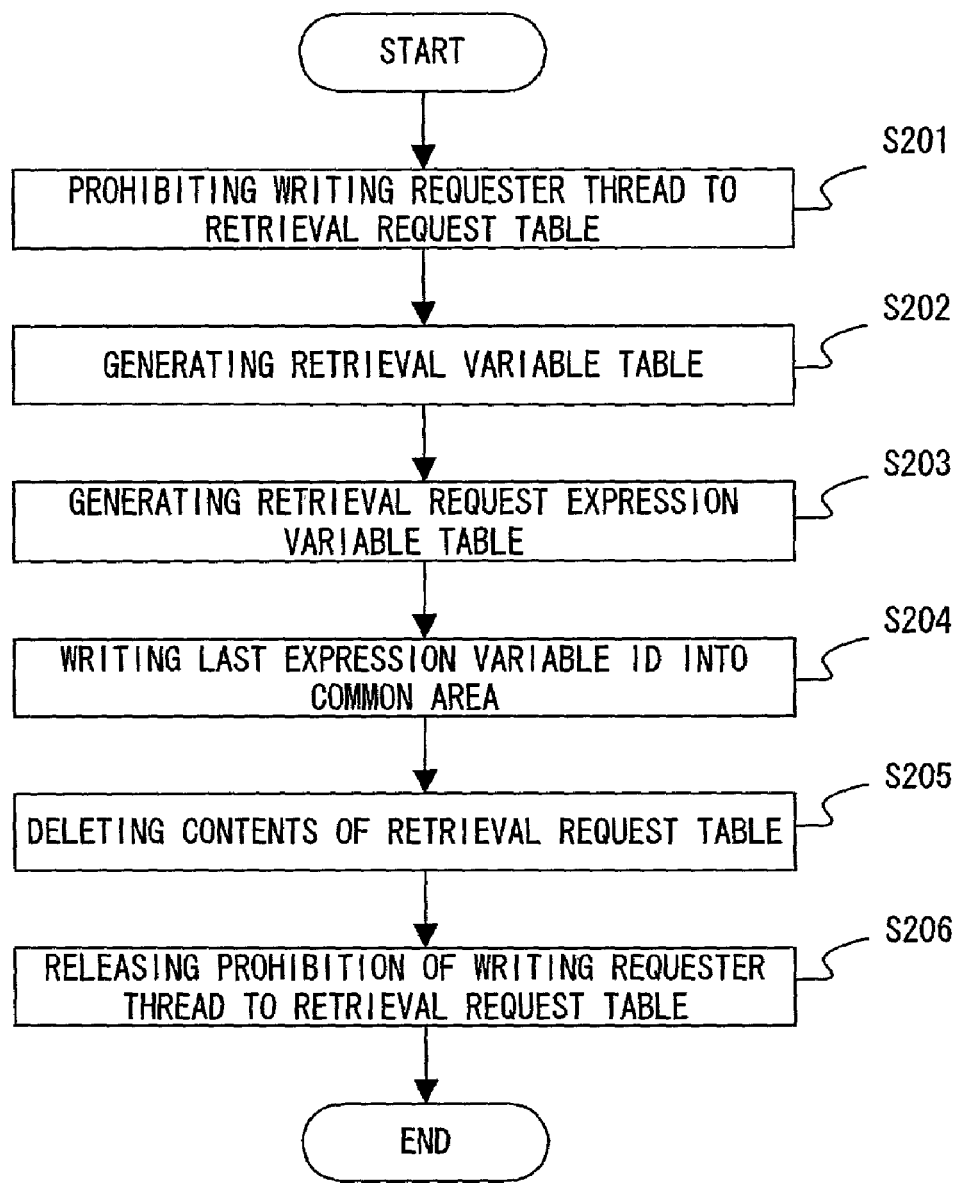
FIG. 20 is a flowchart showing the flow of a pre-process.

FIG. 20 is a flowchart showing the flow of the preprocess.

The preprocess first prohibits a new requester thread from being written to the retrieval request table (step S201).

Then, based on the retrieval request table a keyword variable table and a retrieval request expression variable table are generated (steps S202 and S203), and the last expression variable ID of each requester thread is written to the common area (step S204).

Then, after deleting all contents of the retrieval request table (step S205), the prohibition of writing a requester thread from being written to the retrieval request table is released (step S206).

FIG. 21 shows the concept of a keyword variable table generating process.

A keyword variable table contains table information in which a plurality of item tags and words to be retrieved (collectively referred to as keywords) to be retrieved are arranged. A keyword is assigned a keyword variable, and has a hit flag column indicating whether or not the keyword exists in the record to be searched. The initial value of the hit flag is 0. When there is a hit, the flag is set to 1. The hit flag is used during the retrieving process.

An item tag and a word to be retrieved which are recorded in the keyword variable table are all item tags and words to be retrieved existing in the retrieval request table. However, the item tags and words to be retrieved having the same contents are not recorded more than once.

Figure 22:
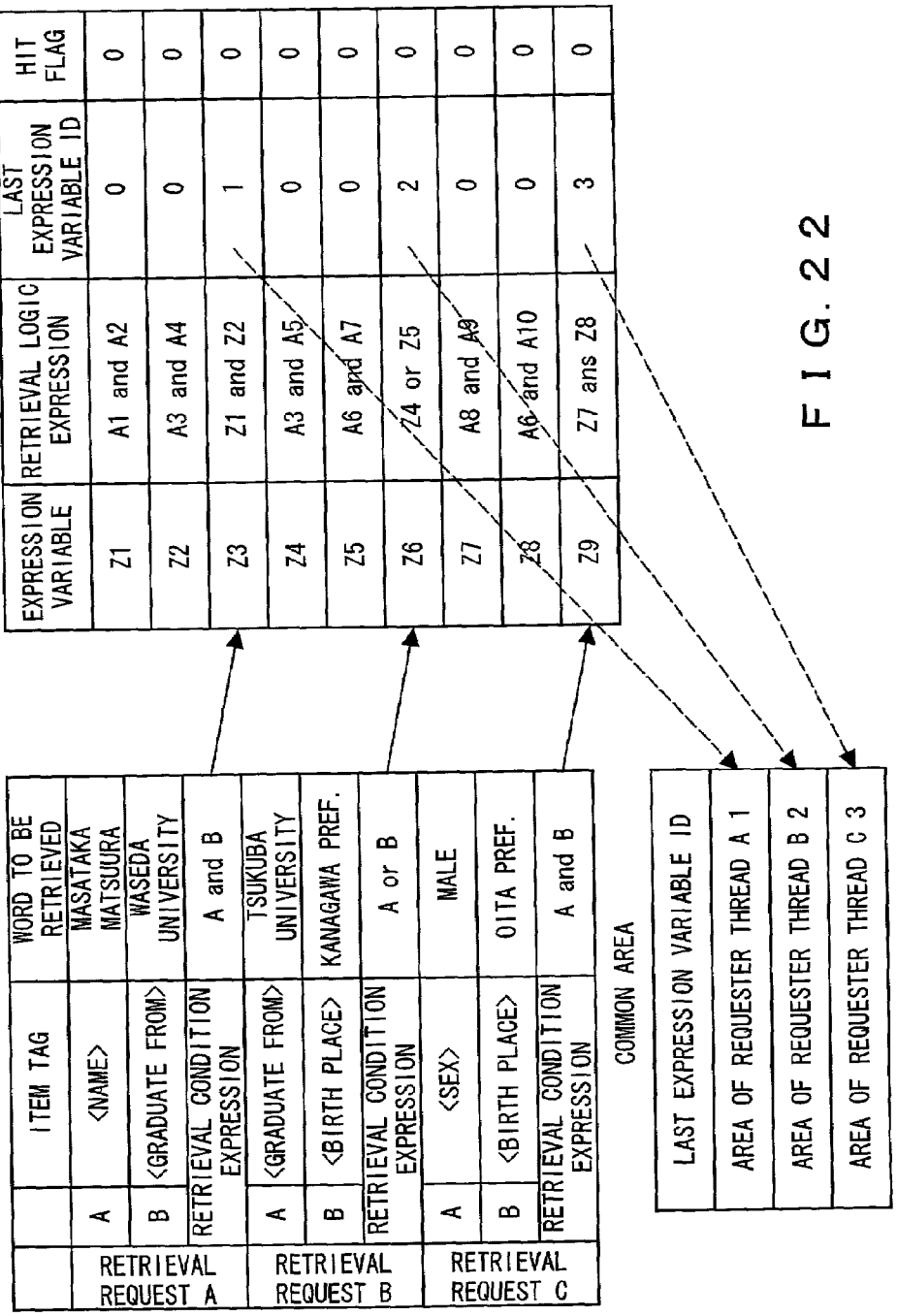
FIG. 22 shows the concept of the retrieval request expression variable table 48 generating process according to the first embodiment.

FIG. 22 shows the concept of generating a retrieval request expression variable table.

A retrieval request expression variable table contains table information in which a plurality of retrieval logic expressions are arranged. Each retrieval logic expression is assigned a uniquely specified code (hereinafter referred to as an expression variable). The retrieval logic expression table stores every combination of a item tag and a word to be retrieved in the retrieval request table as a logical expression obtained by combining a tag variable with a word to be retrieved (practically an assigned keyword variable) using a logical product (and) operator. The expression variable assigned to the logical expression is referred to as a tag expression variable. A tag expression variable having the same contents is not entered more than once.

All retrieval condition expressions in the retrieval request table are replaced with a logical expression in which a tag expression variable is combined by a logical operator, and stored in the retrieval request expression variable table. The expression variable assigned to the logical expression is referred to as a retrieval request expression variable. The retrieval request expression variable having a retrieval logic expression of the same contents is not entered in the retrieval logic expression more than once.

The retrieval request expression variable table has a last expression variable ID column and a hit flag column. The last expression variable ID of a retrieval request expression variable is assigned a number in order from 1. 0 is recorded in the last expression variable ID of a tag variable. The hit flag column is used in the retrieving process. The initial value of the hit flag column is 0.

After a retrieval request expression variable table generating process, the last expression variable ID of a retrieval request expression variable corresponding to the retrieval condition of the requester thread is written to the corresponding area of each requester thread in the common area.

Figure 23:
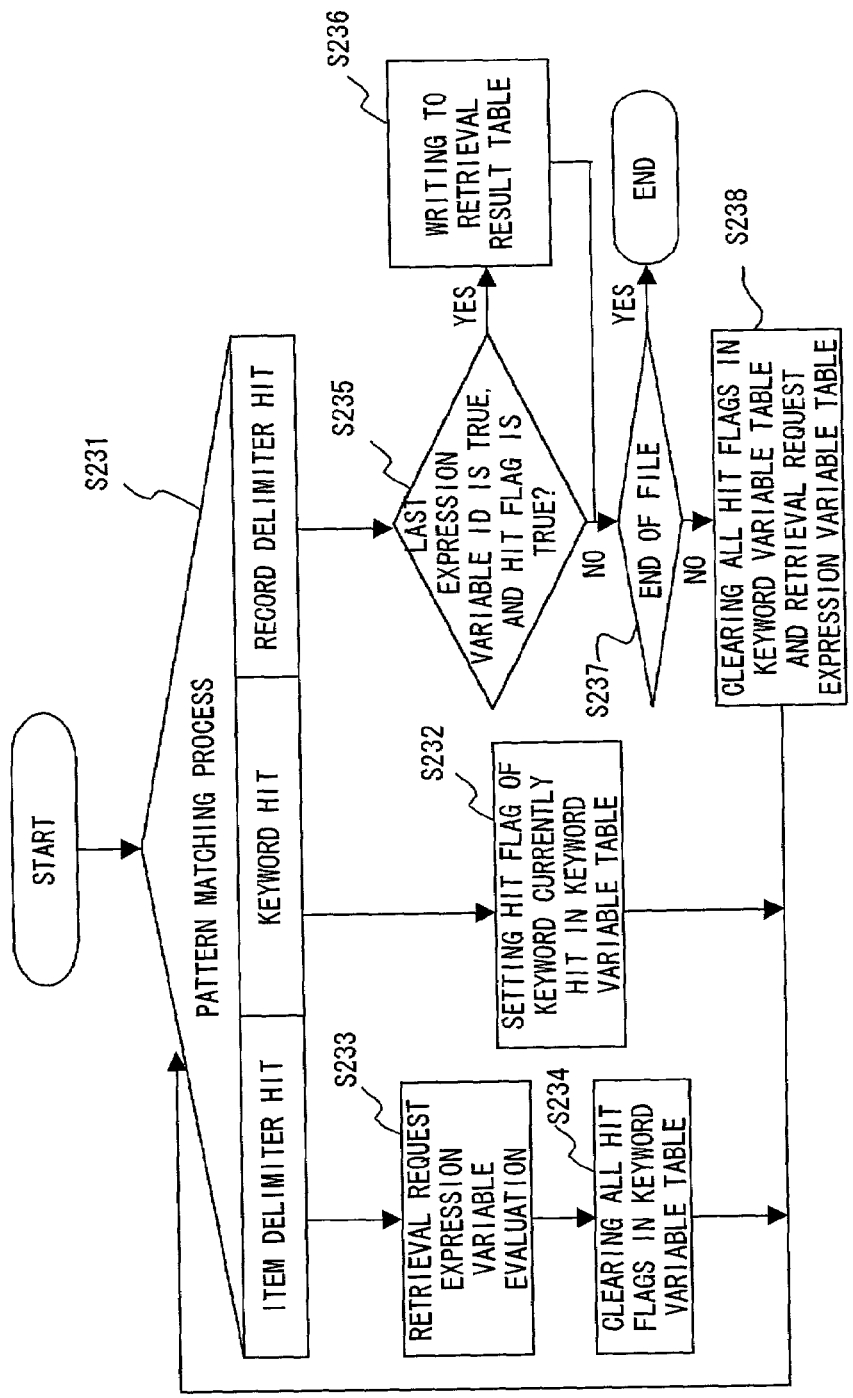
FIG. 23 is a flowchart showing the flow of the retrieving process.

FIG. 23 is a flowchart showing the flow of the retrieving process.

In the retrieving process, a record satisfying a retrieval request from each requester thread is detected in the text data to be searched according to the keyword variable table and the retrieval request expression variable table, and the contents of the record are written to the retrieval result table for each last expression variable ID.

The retrieving process can be roughly divided into a pattern matching process of detecting a specified character string in a file (step S231) and a process performed based on a detected character string (steps S232 through S238).

In the pattern matching process, a record delimiter and an item delimiter are added to all keywords in the keyword variable table, and the full character string collating process is performed from the start of the text data to be searched. In the technology of the pattern matching process according to the present invention, the technology of an AC algorithm, etc. (the above mentioned AC method, EMB method, SA method, etc.) in which the processing time is independent of the number of keywords is used.

First, when a keyword is hit (detected) in the pattern matching process, the hit flag of the keyword hit in the keyword variable table is set as true (1) (step S232).

When the item delimiter is hit, a retrieval request expression variable evaluation is performed (step S233). A retrieval request expression variable evaluation refers to a process of performing a logical operation on all expression variables in the retrieval request expression variable table, and setting the value of a hit flag as true (1).

When the second item delimiter is detected in the case where the text data to be searched shown in FIG. 10 is retrieved, the status of the keyword variable table and the retrieval request expression variable table is shown in FIGS. 24A and 24B.

After the retrieval request expression variable evaluation, all hit flags in the keyword variable table are set as false (0) (step S234).

When a record delimiter is hit, the last expression variable ID which is true (1 or larger) which is the last expression variable ID of a retrieval request expression variable whose hit flag is true (1) (YES is step S235) is retrieved, and the contents of the hit record is written into the column of the last expression variable ID of the retrieval result table (step S236). Then, control is returned to step S231, and the pattern matching process is continued with all hit flags in the keyword variable table and the retrieval request expression variable table set as false (0) (step S238).

When the text data to be searched shown in FIG. 10 is retrieved, the status of the keyword variable table and the retrieval request expression variable table after the retrieval request expression variable evaluation after the last item delimiter of the first record is detected is as shown in FIGS. 25A and 25B. After the process performed after the trailing record delimiter of the first record has been detected, the contents of the retrieval result table are as shown in FIG. 26.

After the retrieving process is completed, the postprocess is performed. The postprocess releases the wait state for each requester thread.

Described above is the first embodiment of the present invention.

The second embodiment of the present invention is described below.

In the first embodiment of the present invention, the retrieval of data in which a record is formed by a plurality of items is described. In the second embodiment, the case in which a record of data to be searched is not divided into items is described.

FIG. 27 shows the contents of the text data to be searched according to the second embodiment of the present invention.

The operations of the control program, the reception program, the requester thread, and the retrieval program are the same as in the first embodiment. However, the contents of the keyword variable table and the retrieval request expression variable table are different between the first and second embodiments.

Figure 29:
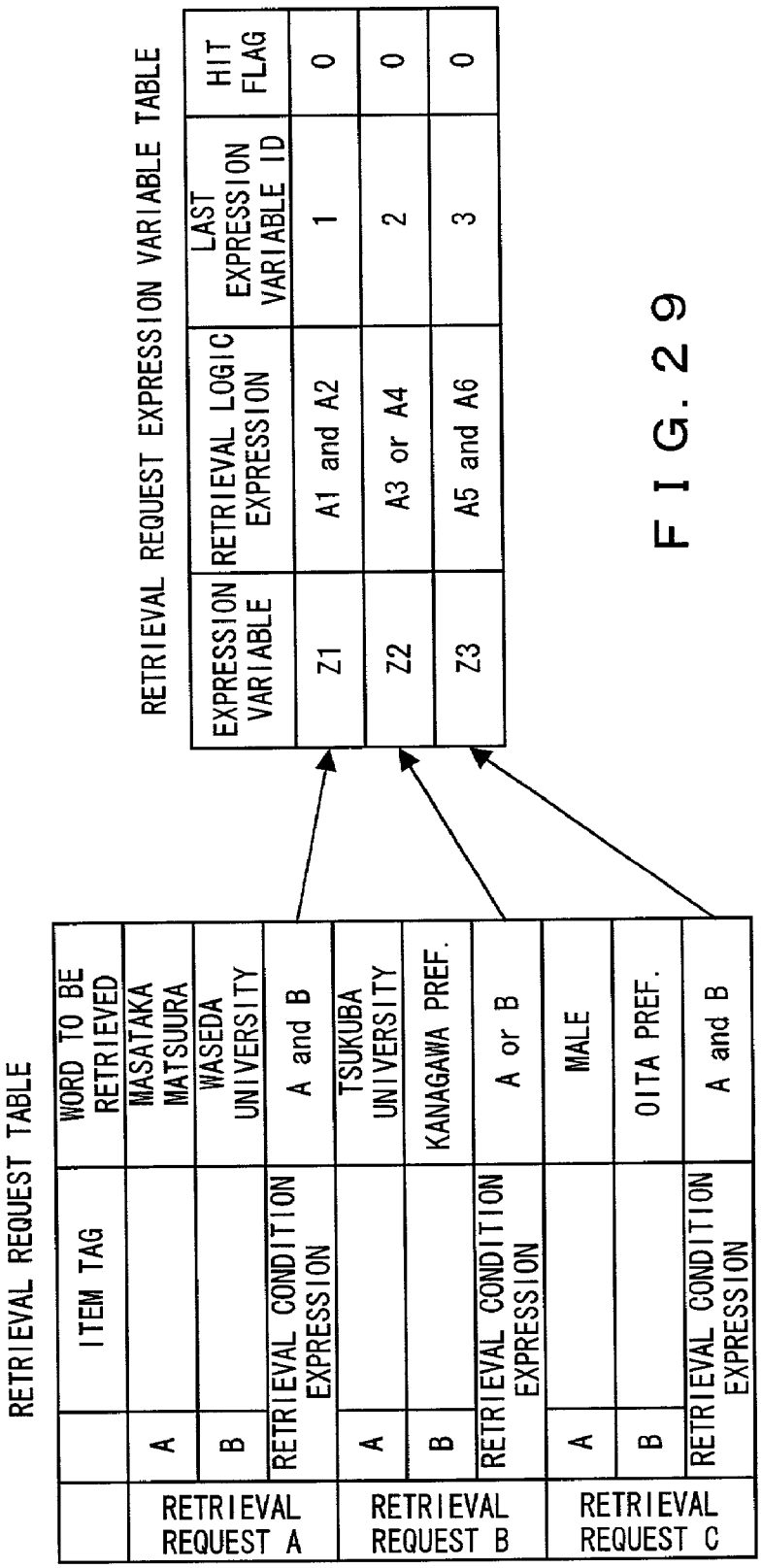
FIG. 29 shows the concept of generating a retrieval request expression variable table according to the second embodiment of the present invention.

When a record is not divided into items, an item tag is not used in a retrieval request. Therefore, FIG. 28 shows the retrieval request table and the keyword variable table according to the second embodiment corresponding to those according to the first embodiment shown in FIG. 21. The retrieval request expression variable table according to the second embodiment corresponding to that shown in FIG. 22 has no tag variable, and is shown in FIG. 29.

Although the retrieving process is also performed as shown in FIG. 23, the contents of the keyword variable table and the retrieval request expression variable table obtained after the retrieval request expression variable evaluation after detecting the last item delimiter of the first record are as shown in FIGS. 30A and 30B.

The retrieval result table obtained after completing the process after detecting the last record delimiter of the first record is as shown in FIG. 31.

Described above by referring to the attached drawings are the embodiments of the present invention, and the present invention has the following characteristics.

(1) When a retrieval request is issued from a terminal, a requester thread having a right to communicate with the terminal is activated for the terminal. Each requester thread writes a retrieval request from the terminal for which it has the right to communicate in one retrieval request table.

(2) When the process of a retrieval program is completed, a retrieving process is performed with the entire retrieval requests which have been written to the retrieval request table processed as one process unit.

(3) All item tags and words to be retrieved existing in the retrieval request table are collectively written into the keyword variable table regardless of a retrieval request unit. At this time, although there are the same item tags or words to be retrieved, they are not to be written more than once in the keyword variable table.

(4) Every logical product (and) condition of an item tag and a word to be retrieved, and every retrieval condition expression are collectively written into the retrieval request expression variable table. At this time, the retrieval logic expressions of the same contents are not written more than once.

(5) Numbers are sequentially written into the last expression variable ID column of the retrieval logic expression corresponding to the retrieval condition expression in the retrieval request table. Furthermore, the assigned number is written to the common area associated with the requester thread which has written the retrieval request having the retrieval condition expression, that is, the source of the retrieval logic expression.

(6) During the pattern matching process on all keywords and text data to be searched in the keyword variable table, the contents of all records whose retrieval logic expression assigned to the last expression variable ID in the retrieval request expression variable table is true (1) are written into the retrieval result table corresponding to the last expression variable ID.

(7) The requester thread sees the last expression variable ID written to the common area, retrieves the contents of the record corresponding to the last expression variable ID from the retrieval result table, and answers the terminal with which it has the right to communicate.

The embodiments of the present invention are described above by referring to the attached drawings, but the pattern retrieval apparatus to which the present invention is applied is not limited to the above mentioned embodiment so far as the functions can be realized. It can be applied to any device regardless of a single device, a system or an integrated device comprising a plurality of devices, a system for performing a process through a network such as a LAN, WAN, etc.

Furthermore, the present invention can be realized by the system comprising a CPU, memory such as ROM, RAM, etc., an input device, an output device, an external storage device, a medium drive device, a portable storage medium, and a network connection device connected through a bus. That is, the present invention can be attained by providing memory such as ROM, RAM, etc., external storage device, and a portable storage medium storing a program code of the software for realizing the system according to the above mentioned embodiments for the pattern retrieval apparatus, and by the computer of the pattern retrieval apparatus reading the program code.

In this case, the program code read from the storage medium realizes a new function of the present invention, and the portable storage medium, etc. storing the program code configures the present invention.

As a portable storage medium for providing a program code can be, for example, a floppy disk, a hard disk, an optical disk, CD-ROM, CD-R, DVD-ROM, DVD RAM, a magnetic tape, a non-volatile memory card, a ROM card, various storage media for storage through a network connection device (that is, a communications line) such as electronic mail, personal computer communications, etc.

Figure 32:
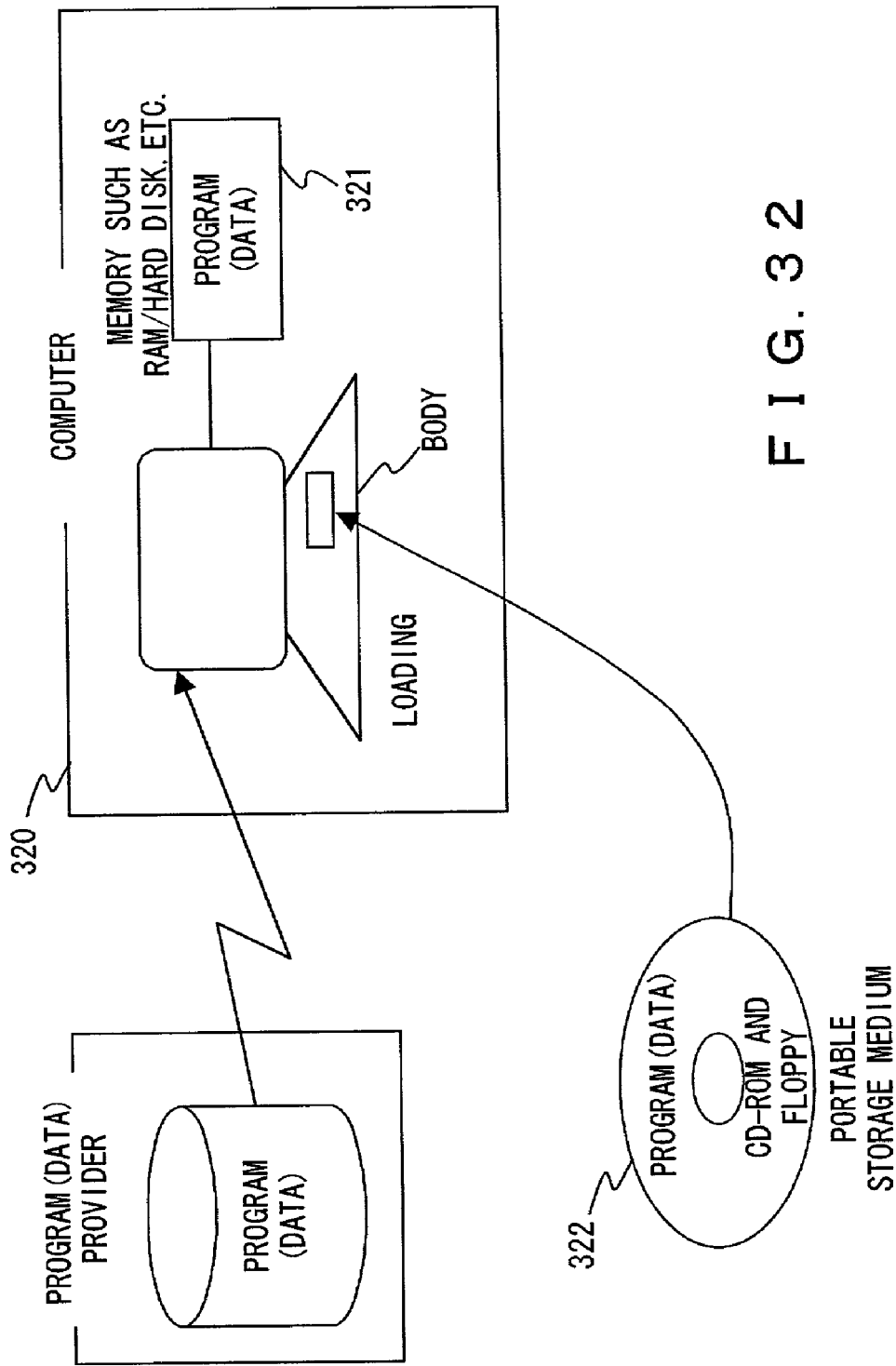
FIG. 32 shows loading a program into a computer according to the present invention.

Furthermore, as shown in FIG. 32, the functions according to the above mentioned embodiments can be realized by the functions according to the above mentioned embodiments by a computer 320 executing the program code read to memory 321, and by the OS, etc. operating in a computer performing a part or all of the actual processes at an instruction of the program code.

Additionally, the functions according to the above mentioned embodiments can be realized by a program code read by a portable storage medium 322, and written to the memory 321 provided in a function extension board inserted into the computer 320 and a function extension unit connected to the computer 320, and the CPU, etc. of the function extension board and the function extension unit performing a part or all of the actual processes at an instruction of the program code.

That is, the present invention is not limited to the above mentioned embodiments according to the present invention, but can be realized within the scope of the gist of the present invention.

As described above, in the full text retrieval system using the character string collating method according to the present invention, a process can be performed at an exceedingly high speed as compared with the conventional technology when a large number of retrieval request are received within a short time.

Furthermore, according to the present invention, as compared with the full text retrieval system requiring an index file, the software can be considerably small, and an index file is not to be maintained, thereby realizing an operable system.

That is, when a large number of retrieval requests are received in time series within a short time in a full text retrieval system using the character string collating method according to the present invention, all retrieval requests can be processed in a time shorter than the value obtained by multiplying the time required in individually processing one retrieval request by the number of retrieval requests. For example, using a retrieval engine requiring 1 second for individually processing one retrieval request, 100 retrieval requests can be completed in 3 seconds.

What is claimed is:

1. A pattern retrieving method for use with a pattern retrieval apparatus connected to a plurality of terminal devices through a network, comprising:

receiving, from a terminal apparatus, a search condition set that comprises a search-pattern and a search-formula used when searching through data constituting a search target, together with a terminal apparatus identifier that identifies the terminal apparatus associated with a search condition set;

storing search condition sets and terminal apparatus identifiers received from one or more of the terminal apparatuses into a search-condition buffer; and when investigation determines that no preceding search-process is in progress and that two or more search-patterns are same as each other among those stored in the search condition buffer;

leaving a first of the same search-patterns in the search-condition buffer and erasing second and further ones being same to the first one;

generating a search-pattern-variable table containing and correlating the search-pattern and a first variable that makes the search-pattern an associated value;

further generating a search-query-formula-variable table containing and correlating, in a manner based on search-formulas and the terminal apparatus identifiers stored in the search-condition buffer and the generated search-pattern-variable table, a first search-query formula describing the search-pattern in a form using the first variable; and a second variable that makes the first search-query formula the associated value and further correlates the terminal apparatus identifier with a second search-query-formula describing the first search-query-formula-in a form using the second variable and the second variable that makes the first search-query-formula the associated value, and searching through a search-target database containing said data of the search-target according to the search-query-formula-variable table for extracting a data set that matches with the search condition set received from any of the plurality of terminal apparatuses as a search result; and transmitting the search result back to a relevant terminal apparatus.

2. The method according to claim 1, wherein said search condition buffer stores the search condition until it is determined that a retrieving process is completed.

3. The method according to claim 1, wherein said search condition buffer stores the search condition until a predetermined time is reached or a predetermined capacity is filled.

4. The method according to claim 1, wherein retrieval performed by the retrieval apparatus includes simultaneously retrieving a plurality of retrieval patterns.

5. The method according to claim 1, wherein retrieval performed by the retrieval apparatus is performed in one of an Aho-Corasick (AC) method, an Expanded-Boyer-Moore (EBM) method, and a Shinohara-Arikawa (SA) method.

6. A pattern retrieval apparatus connected to a plurality of terminal devices through a network, comprising:

a retrieval condition reception unit, receiving, from a terminal apparatus, a search condition set that comprises a search-pattern and a search-formula used when searching through data constituting a search target, together with a terminal apparatus identifier that identifies the terminal apparatus associated with a search condition set;

a retrieval condition buffer unit, storing search condition sets and terminal apparatus identifiers received from one or more of the terminal apparatuses into a search-condition buffer;

a retrieving process determination unit for investigating and when investigation and determines no preceding search-process is in progress and that two or more search-patterns are same as each other among those stored in the search-patterns condition buffer, leaving a first of the same search-patterns in the search-condition buffer and erasing second and further ones being same to the first one;

a variable table generating unit generating a search-pattern-variable table containing and correlating the search-pattern and a first variable that makes the search-pattern an associated value and further generating a search-query-formula-variable table containing and correlating, in a manner based on search-formulas and the terminal apparatus identifiers stored in the search-condition buffer and the generated search-pattern-variable table, a first search-query formula describing the search-pattern in a form using the first variable; and a second variable that makes the first search-query formula the associated value and further correlates the terminal apparatus identifier with a second search-query-formula describing the first search-query-formula-in a form using the second variable and the second variable that makes the first search-query-formula the associated value, and searching through a search-target database containing said data of the search-target according to the search-query-formula-variable table for extracting a data set that matches with the search condition set received from any of the plurality of terminal apparatuses as a search result; and a transmission unit transmitting the search result back to a relevant terminal apparatus.

7. The apparatus according to claim 6, wherein said search condition buffer unit stores the search condition until said retrieving process determination unit determines that a retrieving process is completed.

8. The apparatus according to claim 6, wherein said search condition buffer unit stores the search condition until a predetermined time is reached or a predetermined capacity is filled.

9. The apparatus according to claim 6, wherein said retrieval condition buffer unit simultaneously retrieves a plurality of retrieval patterns.

10. The apparatus according to claim 6, wherein said search condition buffer unit operates according to one of an Aho-Corasick (AC) method, an Expanded-Boyer-Moore (EBM) method, and a Shinohara-Arikawa (SA) method.

11. A computer-readable storage medium storing a program code of a pattern retrieval program executed by a pattern retrieval apparatus connected to a plurality of terminal devices through a network, said program code comprising:

receiving, from a terminal apparatus, a search condition set that comprises a search-pattern and a search-formula and-is-used when searching through data constituting a search target, together with a terminal apparatus identifier that identifies the terminal apparatus associated with a search condition set;

storing search condition sets and terminal apparatus identifiers received from one or more of the terminal apparatuses into a search-condition buffer; and when investigation determines that no preceding search-process is in progress and that two or more search-patterns are same as each other among those stored in the search-condition buffer;

leaving a first of the same search-patterns in the search-condition buffer and erasing second and further ones being same to the first one;

generating a search-pattern-variable table containing and correlating the search-pattern and a first variable that makes the search-pattern an associated value;

further generating a search-query-formula-variable table containing and correlating, in a manner based on search-formulas and the terminal apparatus identifiers stored in the search-condition buffer and the generated search-pattern-variable table, a first search-query formula describing the search-pattern in a form using the first variable; and a second variable that makes the first search-query formula the associated value and further correlates the terminal apparatus identifier with a second search-query-formula describing the first search-query-formula in a form using the second variable and the second variable that makes the first search-query-formula the associated value, and searching through a search-target database containing said data of the search-target according to the search-query-formula variable table for extracting a data set that matches with the search condition set received from any of the plurality of terminal apparatuses as a search result; and transmitting the search result back to a relevant terminal apparatus.

12. The storage medium according to claim 11, wherein said search condition buffer stores the search condition until it is determined that a retrieving process is completed.

13. The storage medium according to claim 11, wherein said search condition buffer stores the retrieval condition until a predetermined time is reached or a predetermined capacity is filled.

14. The storage medium according to claim 11, wherein a plurality of retrieval patterns are simultaneously retrieved.

15. The storage medium according to claim 11, wherein retrieval is performed in one of an Aho-Corasick (AC) method, an Expanded-Boyer- Moore (EBM) method, and a Shinohara-Arikawa (SA) method.

16. A pattern retrieval system in which a plurality of terminal devices and a pattern retrieval apparatus are connected through a network, wherein:

each of said plurality of terminal devices comprises:

a terminal device side transmission unit transmitting a search condition containing a search pattern for data to be searched and a search-formula together with terminal device information for designating each terminal device;

said pattern retrieval system comprises:

a retrieval target data storage unit storing data to be searched;

a retrieval condition reception unit receiving a retrieval condition, transmitted from each terminal device side transmission unit of said plurality of terminal devices together with the terminal device information for designation of each of the terminal devices, including a retrieval pattern and a retrieval expression for retrieval of the data to be searched;

a retrieval condition buffer unit storing the retrieval condition and the terminal device information received by said retrieval condition reception unit;

a retrieving process determination unit determining whether or not a preceding retrieving process is being performed;

a retrieval pattern variable table generation unit generating, when the retrieving process determination unit determines that the preceding retrieving process is not being performed, a retrieval pattern variable table in which a retrieval pattern and a first variable having the retrieval pattern as a value are associated with each other, if there are two or more identical retrieval patterns in the retrieval patterns stored in said retrieval condition buffer units, excluding the retrieval patterns other than one retrieval pattern;

a retrieval request expression variable table generation unit generating a retrieval request expression variable table in which the retrieval request expression indicating the retrieval pattern using the first variable and the second variable having the retrieval request expression as a value are associated, and the retrieval request expression indicating the terminal device information and the retrieval expression using the second variable and the second variable having the retrieval request expression as a value are associated based on the retrieval expression and the terminal device information stored in said retrieval condition buffer unit, and the retrieval pattern variable table generated by said retrieval pattern variable table generation unit;

a retrieval unit extracting a retrieval result matching the retrieval condition transmitted from each of the plurality of terminal devices by searching said retrieval target data storage unit according to the retrieval request expression variable table generated by said retrieval request expression variable table generation unit; and a transmission unit transmitting the retrieval result extracted by said retrieval unit to each of the plurality of terminal devices; and each of said plurality of terminal devices further comprises a terminal device side reception unit receiving the result transmitted by said transmission unit.

17. A pattern retrieval program executed by a pattern retrieval apparatus connected to a plurality of terminal devices through a network, comprising:

receiving, from a terminal apparatus, a search condition set that comprises a search-pattern and a search-formula and is-used when searching through data constituting a search target, together with a terminal apparatus identifier that identifies the terminal apparatus associated with a search condition set;

storing search condition sets and terminal apparatus identifiers received from one or the terminal apparatuses into a search-condition buffer; and when investigation determines that no preceding search-process is in progress and that two or more search-patterns are same as each other among those stored in the search-condition buffer leaving a first of the same search-patterns in the search-condition buffer and erasing second and further ones being same to the first one, generating a search-pattern-variable table containing and correlating the search-pattern and a first variable that makes the search-pattern an associated value;

further generating a search-query-formula-variable table containing and correlating, in a manner based on search-formulas and the terminal apparatus identifiers stored in the search-condition buffer and the generated search-pattern-variable table, a first search-query formula describing the search-pattern in a form using the first variable; and a second variable that makes the first search-query formula the associated value and further correlates the terminal apparatus identifier with a second search-query-formula describing the first search-query-formula-in a form using the second variable and the second variable that makes the first search-query-formula the associated value, and searching through a search-target database containing said data of the search-target according to the search-query-formula-variable table for extracting a data set that matches with the search condition set received from any of the plurality of terminal apparatuses as a search result; and transmitting the search result back to a relevant terminal apparatus.

18. The pattern retrieval program according to claim 17, wherein said search condition buffer stores the search condition until it is determined that a retrieving process is completed.

19. The pattern retrieval program according to claim 17, wherein said search condition buffer stores the search condition until a predetermined time is reached or a predetermined capacity is filled.

20. The pattern retrieval program according to claim 17, wherein a plurality of retrieval patterns are simultaneously retrieved.

21. The pattern retrieval program according to claim 17, wherein retrieval is performed according to one of an Aho-Corasick (AC) method, an Expanded-Boyer-Moore (EBM) method, and a Shinohara-Arikawa (SA) method.

22. A pattern retrieval apparatus connected to a plurality of terminal devices through a network, comprising:

a retrieval condition reception means, receiving, from a terminal apparatus, a search condition set that comprises a search-pattern and a search-formula and-is-used when searching through data constituting a search target, together with a terminal apparatus identifier that identifies the terminal apparatus associated with a search condition set;

a retrieval condition buffer means, storing search condition sets and terminal apparatus identifiers received from one or more of the terminal apparatuses into a search-condition buffer;

a retrieving process determination means for investigating and when determining that no preceding search-process is in progress and that two or more search-patterns are same as each other among those stored in the search-condition buffer, leaving a first of the same search-patterns in the search-condition buffer and erasing second and further ones being same to the first one, a variable table generating means generating a search-pattern-variable table containing and correlating the search-pattern and a first variable that makes the search-pattern an associated value and further generating a search-query-formula-variable table containing and correlating, in a manner based on search-formulas and the terminal apparatus identifiers stored in the search-condition buffer and the generated search-pattern-variable table, a first search-query formula describing the search-pattern in a form using the first variable; and a second variable that makes the first search-query formula the associated value and further correlates the terminal apparatus identifier with a second search-query-formula describing the first search-query-formula-in a form using the second variable and the second variable that makes the first search-query-formula the associated value, and searching through a search-target database containing said data of the search-target according to the search-query-formula-variable table for extracting a data set that matches with the search condition set received from any of the plurality of terminal apparatuses as a search result; and a transmission means transmitting the search result back to a relevant terminal apparatus.

* * * * *

UNITED STATES PATENT AND TRADEMARK OFFICE
CERTIFICATE OF CORRECTION

PATENT NO. : 7,089,227 B2  
APPLICATION NO. : 09/998225  
DATED : August 8, 2006  
INVENTOR(S) : Fumirou Abe et al.

It is certified that error appears in the above-identified patent and that said Letters Patent is hereby corrected as shown below:

Column 17, Line 53, change "search-patterns condition" to --search-condition--.

Column 18, Line 65-66, change "search-query formula in" to --search-condition--.

Column 19, Line 3, change "search-query-formula variable" to --search-query-formula-variable--.

Column 19, Line 28, change "search pattern" to --search-pattern--.

Column 20, Line 28, after "one or" insert --more of--.

Column 21, Line 16-17, change "and-is-used" to --and is-used--.

Signed and Sealed this

Second Day of January, 2007

JON W. DUDAS  
*Director of the United States Patent and Trademark Office*